(12) United States Patent
Sun

(10) Patent No.: US 11,145,086 B2
(45) Date of Patent: Oct. 12, 2021

(54) ELECTRONIC DEVICE, AND METHOD AND APPARATUS FOR CONTROLLING THE SAME

(71) Applicant: Guangdong Oppo Mobile Telecommunications Corp., Ltd., Guangdong (CN)

(72) Inventor: Jianbo Sun, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 31 days.

(21) Appl. No.: 16/564,982

(22) Filed: Sep. 9, 2019

(65) Prior Publication Data

US 2019/0392611 A1 Dec. 26, 2019

Related U.S. Application Data

(63) Continuation of application No. PCT/CN2017/076202, filed on Mar. 9, 2017.

(51) Int. Cl.
*G06T 7/80* (2017.01)
*H04N 5/225* (2006.01)
(Continued)

(52) U.S. Cl.
CPC .............. *G06T 7/80* (2017.01); *G06T 5/002* (2013.01); *G06T 5/003* (2013.01); *G06T 5/20* (2013.01);
(Continued)

(58) Field of Classification Search
CPC .. G06T 7/80; G06T 7/536; G06T 7/90; G06T 7/70; G06T 5/002; G06T 5/003;
(Continued)

(56) References Cited

U.S. PATENT DOCUMENTS 9,712,760 B2 * 7/2017 Furuhashi .......... H04N 5/23222
2008/0218603 A1 * 9/2008 Oishi ..................... H04N 5/772
348/231.99
(Continued)

FOREIGN PATENT DOCUMENTS

CN 101231752 A 7/2008
CN 101909150 A 12/2010
(Continued)

OTHER PUBLICATIONS

Search report for EP application 17899837.3 dated Jun. 25, 2020.
(Continued)

*Primary Examiner* — Shahbaz Nazrul
(74) *Attorney, Agent, or Firm* — Young Basile Hanlon & MacFarlane, P.C.

(57) ABSTRACT

The present disclosure provides a control method, a control apparatus, and an electronic device. The method is for controlling an electronic device based on scene data collected by an imaging apparatus of the electronic device. The scene data includes a cached main image. The control method includes: processing the scene data to acquire depth information of the cached main image; acquiring a foreground portion of the cached main image based on the depth information; and controlling the electronic device based on the foreground portion.

20 Claims, 36 Drawing Sheets

(51) Int. Cl.
| | |
|---|---|
| *H04N 5/235* | (2006.01) |
| *G06T 7/536* | (2017.01) |
| *G06T 7/90* | (2017.01) |
| *G06T 7/70* | (2017.01) |
| *G06T 5/00* | (2006.01) |
| *G06T 5/20* | (2006.01) |
| *G06T 7/20* | (2017.01) |
| *G06T 7/60* | (2017.01) |
| *H04N 5/247* | (2006.01) |
| *H04N 5/262* | (2006.01) |
| *H04N 9/68* | (2006.01) |

(52) U.S. Cl.
CPC ............... *G06T 7/20* (2013.01); *G06T 7/536* (2017.01); *G06T 7/60* (2013.01); *G06T 7/70* (2017.01); *G06T 7/90* (2017.01); *H04N 5/2259* (2013.01); *H04N 5/2351* (2013.01); *H04N 5/2352* (2013.01); *H04N 5/247* (2013.01); *H04N 5/2628* (2013.01); *H04N 9/68* (2013.01); *G06T 2207/10144* (2013.01)

(58) Field of Classification Search
CPC .... G06T 5/20; G06T 7/20; G06T 7/60; G06T 2207/10144; H04N 5/2259; H04N 5/2351; H04N 5/2352; H04N 5/247; H04N 5/2628; H04N 9/68; H04N 5/23222; H04N 5/2226; H04N 5/232
See application file for complete search history.

(56) References Cited

U.S. PATENT DOCUMENTS

| | | | |
|---|---|---|---|
| 2009/0219383 A1 | 9/2009 | Passmore | |
| 2010/0110266 A1* | 5/2010 | Lee ................... | H04N 5/23219 348/333.02 |
| 2011/0008036 A1* | 1/2011 | Takatsuka ........ | H04N 5/232 945 396/283 |
| 2015/0010239 A1* | 1/2015 | He .................... | G06K 9/00664 382/203 |
| 2016/0191896 A1* | 6/2016 | Basche ............... | H04N 13/111 348/46 |
| 2017/0374246 A1* | 12/2017 | Wang ................. | H04N 5/2257 |

FOREIGN PATENT DOCUMENTS

| | | |
|---|---|---|
| CN | 103188423 A | 7/2013 |
| CN | 104333700 A | 2/2015 |
| CN | 104333748 A | 2/2015 |
| CN | 104917973 A | 9/2015 |
| CN | 105303543 A | 2/2016 |
| CN | 105551037 A | 5/2016 |
| CN | 106131418 A | 11/2016 |
| CN | 106327473 A | 1/2017 |
| CN | 106446873 A | 2/2017 |
| CN | 106973224 A | 7/2017 |
| CN | 106998389 A | 8/2017 |
| JP | 2011015380 A | 1/2011 |
| WO | 2016038971 A1 | 3/2016 |

OTHER PUBLICATIONS

English translation of OA for CN application 201780080762.9 dated Aug. 5, 2020.
Smartphone dual camera showdown: Two cameras different focus:<http://www.zdnet.com/article/smartphone-dual-camera-showdown-two-cameras-different-focus/; pp. 1-12; Feb. 14, 2019.
Panasonic Operating Instructions Digital Camera/Lens Kit Body DMC-GF1; pp. 1-204; Panasonic Corporation; 2009.
Partial Supplementary European Search Report for European Application No. 17899837.3 dated Feb. 17, 2020.
NPL_ISR_PCTCN2017076202 with English Translation_dated Mar. 9, 2017.
Indian Examination Report for IN Application 201917038629 dated Feb. 8, 2021. (5 pages).
Chinese Second Office Action with English Translation for CN Application 201780080762.9 dated May 8, 2021. (41 pages).

* cited by examiner

ELECTRONIC DEVICE, AND METHOD AND APPARATUS FOR CONTROLLING THE SAME

CROSS-REFERENCE TO RELATED APPLICATION(S)

This application is a continuation application of International Application No. PCT/CN2017/076202, filed Mar. 9, 2017, the entire contents of which are incorporated herein by reference.

TECHNICAL FIELD

The present disclosure relates to the field of consumer electronic technologies, and more particularly, to a depth-based control method, a control apparatus, and an electronic device.

BACKGROUND

Manners for controlling mobile phones in the related art, are relatively simple and not intelligent enough.

SUMMARY

The present disclosure provides a control method, for controlling an electronic device based on scene data collected by an imaging apparatus of the electronic device. The scene data includes a cached main image. The control method includes: processing the scene data to acquire depth information of the cached main image; acquiring a foreground portion of the cached main image based on the depth information; and controlling the electronic device based on the foreground portion.

An electronic device provided in the embodiments of the present disclosure, includes an imaging apparatus and the control apparatus.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily from the following descriptions made with reference to the drawings, in which.

Figure 1:
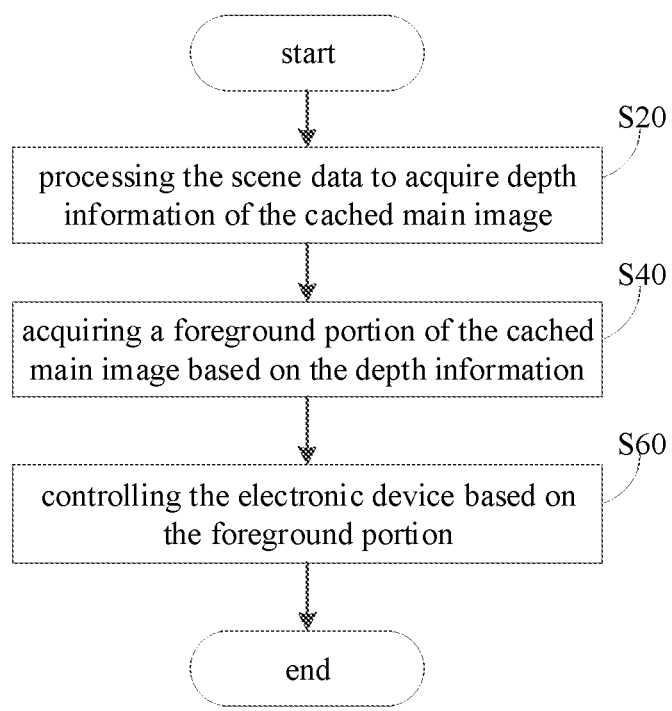
FIG. 1 is a flow chart illustrating a control method according to some embodiments of the present disclosure.

Reference numbers: electronic device 1000, control apparatus 100, processing module 20, acquiring module 40, control module 60, first determining submodule 601, first searching submodule 602, first control submodule 603, second determining submodule 604, second searching submodule 605, second control submodule 606, third determining submodule 607, third searching submodule 608, first processing submodule 609, fourth determining submodule 611, fourth searching submodule 612, third control submodule 613, fifth determining submodule 614, fifth searching submodule 615, fourth control submodule 616, sixth determining submodule 617, seventh determining submodule 618, first acquiring unit 6182, second acquiring unit 6184, first determining unit 6186, fifth control submodule 619, eighth determining submodule 621, ninth determining submodule 622, tenth determining submodule 623, sixth control submodule 624, second processing submodule 625, third processing submodule 626, eleventh determining submodule 627, fourth processing submodule 628, fifth processing submodule 629, sixth processing submodule 631, seventh processing submodule 632, twelfth determining submodule 633, eighth processing submodule 634, first judging submodule 635, thirteenth determining submodule 636, ninth processing submodule 637, first processing unit 6372, second processing unit 6374, third processing unit 6376, second judging submodule 638, seventh control submodule 639, fourteenth determining submodule 641, fifteenth determining submodule 642, tenth processing submodule 643, eleventh processing submodule 644, fourth processing unit 6442, second determining unit 6444, fifth processing unit 6446, sixteenth determining submodule 645, acquiring submodule 646, twelfth processing submodule 647, sixth processing unit 6472, seventh processing unit 6474, eighth processing unit 6476, seventeenth determining submodule 648, thirteenth processing submodule 649, third determining unit 6492, ninth processing unit 6494, imaging apparatus 200, rotatable camera 210, main lens 220, image sensor 230, wide-angle camera 240, telephoto camera 250, displayer 300, orientation sensor 400, actuator 600, communication module 700, circuit board 810, processor 820, memory 830, power supply circuit 840.

DETAILED DESCRIPTION

Reference will now be made in detail to embodiments of the present disclosure, examples of which are illustrated in the drawings. The following description refers to the drawings in which the same or similar numbers in different drawings represent the same or similar elements and the elements having same or similar functions throughout the descriptions unless otherwise represented. The embodiments described below with reference to the drawings are explanatory, and are intended to be illustrative of the present disclosure, and are not to be construed to limit the present disclosure.

It is to be understood that, in the description of the present disclosure, terms such as "first" and "second" are used herein for purposes of description and are not intended to indicate or imply relative importance or significance, or imply the number of technical features indicated. Furthermore, the feature defined with "first" and "second" may comprise one or more this feature distinctly or implicitly. In the description of the present disclosure, "a plurality of" means two or more than two, unless specified otherwise.

In the present disclosure, unless specified or limited otherwise, the terms "mounted," "connected," and "coupled" are understood broadly, such as fixed, detachable mountings, connections and couplings or integrated, and can be mechanical or electrical or communicating mountings, connections and couplings, and also can be direct and via media indirect mountings, connections, and couplings, and further can be inner mountings, connections and couplings of two components or interaction relations between two components, which can be understood by those skilled in the art according to the detail embodiment of the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Figure 2:
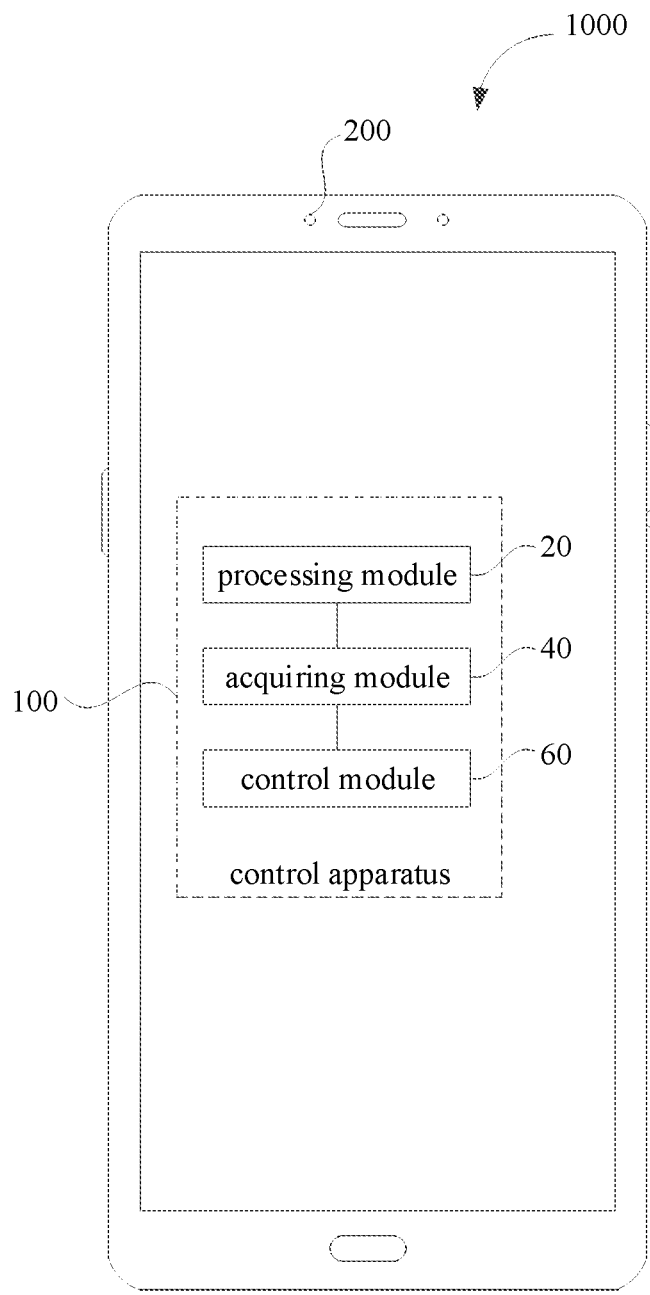
FIG. 2 is a block diagram illustrating an electronic device according to some embodiments of the present disclosure.

Referring to FIG. 1 and FIG. 2 together, a depth-based control method, according to an embodiment of the present disclosure, is for controlling an electronic device 1000 based on scene data collected by an imaging apparatus 200 of the electronic device 1000. The scene data may include a cached main image. The control method may include acts in the following blocks.

At block S20, the scene data is processed to acquire depth information of the cached main image.

At block S40, a foreground portion of the cached main image is acquired based on the depth information.

At block S60, the electronic device 1000 is controlled based on the foreground portion.

Referring to FIG. 2 again, a depth-based control apparatus 100, according to an embodiment of the present disclosure, is for controlling an electronic device 1000 based on scene data collected by an imaging apparatus 200 of the electronic device 1000. The scene data may include a cached main image. The control apparatus 100 may include a processing module 20, an acquiring module 40, and a control module 60. The processing module 20 is configured to process the scene data to acquire depth information of the cached main image. The acquiring module 40 is configured to acquire a foreground portion of the cached main image based on the depth information. The control module 60 is configured to control the electronic device 1000 based on the foreground portion.

That is, the control method provided in the embodiment of the present disclosure may be implemented by the control apparatus 100 provided in the embodiment of the present disclosure. The act in block S20 may be implemented by the processing module 20. The act in block S40 may be implemented by the acquiring module 40. The act in block S60 may be implemented by the control module 60.

The control apparatus 100 according to the embodiment of the present disclosure may be applied to the electronic device 1000 according to the embodiment of the present disclosure. That is, the electronic device 1000 according to the embodiment of the present disclosure may include the control apparatus 100 according to the embodiment of the present disclosure. The electronic device 1000 according to the embodiment of the present disclosure may further include an imaging apparatus 200. The control apparatus 100 is electrically coupled to the imaging apparatus 200.

With the depth-based control method, the control apparatus 100, and the electronic device 1000, provided in the embodiments of the present disclosure, the depth information of the image is employed to control the electronic device 1000, making manners for controlling the electronic device 1000 richer and more intelligent.

In some embodiments, the electronic device 1000 may include a mobile phone, a tablet computer, a smart watch, a notebook computer, a smart wristband, smart helmet, or the like. In the embodiment, the electronic device 1000 may include the mobile phone.

Figure 3:
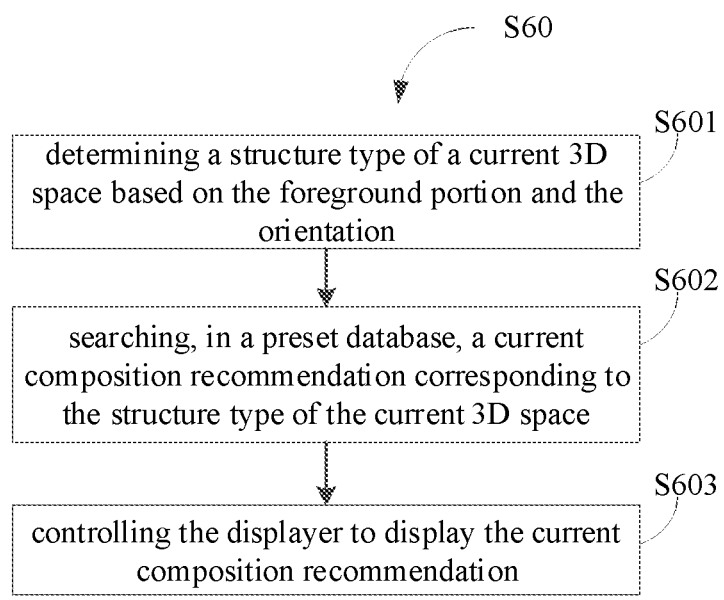
FIG. 3 is a flow chart illustrating a control method according to some embodiments of the present disclosure.
Figure 4:
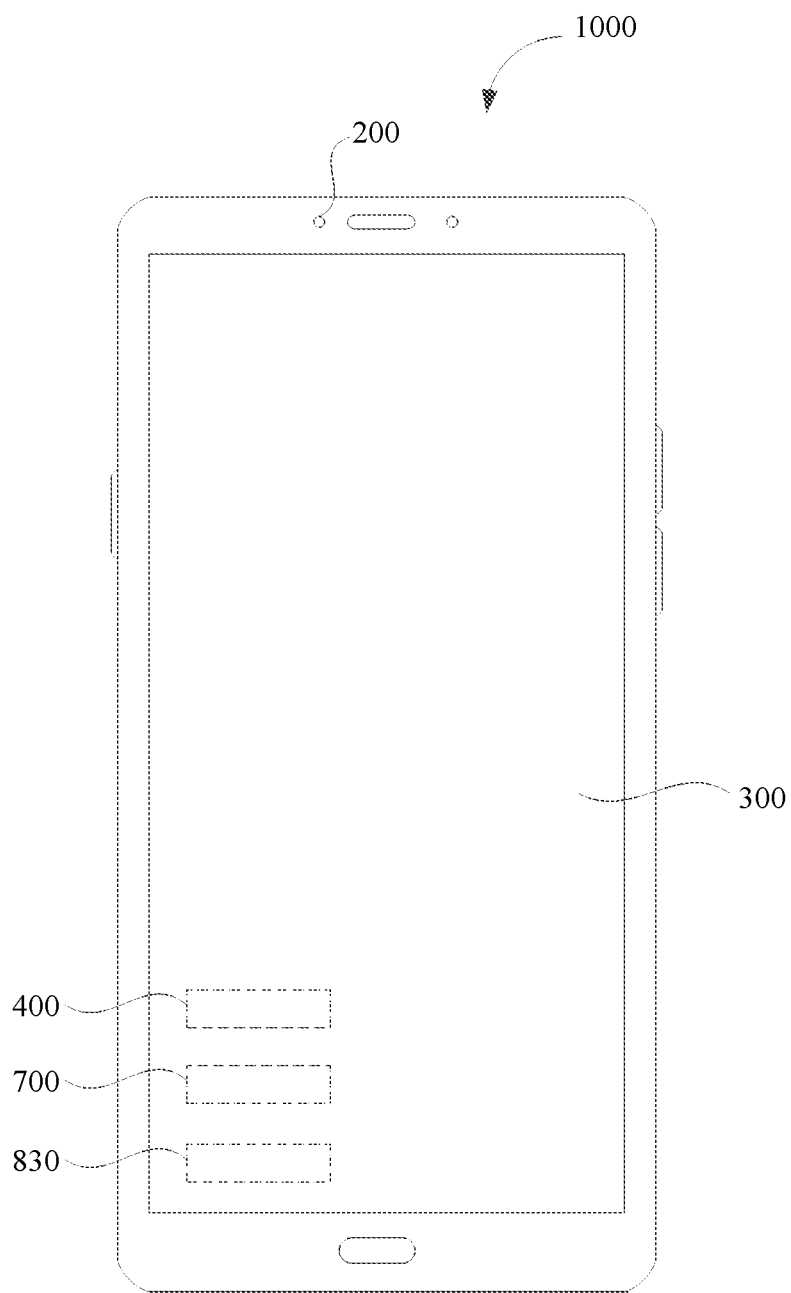
FIG. 4 is a block diagram illustrating an electronic device according to some embodiments of the present disclosure.

Referring to FIG. 3 and FIG. 4 together, in some embodiments, the electronic device 1000 may include a displayer 300 and an orientation sensor 400. The orientation sensor 400 is configured to sense an orientation of the imaging apparatus 200. The act in block S60 may include acts in the following blocks.

At block S601, a structure type of a current three-dimensional (3D) space is determined based on the foreground portion and the orientation.

At block S602, a current composition recommendation corresponding to the structure type of the current 3D space is searched in a preset database. The preset database includes a plurality of foreground types and corresponding composition recommendations.

At block S603, the displayer 300 is controlled to display the current composition recommendation.

Figure 5:
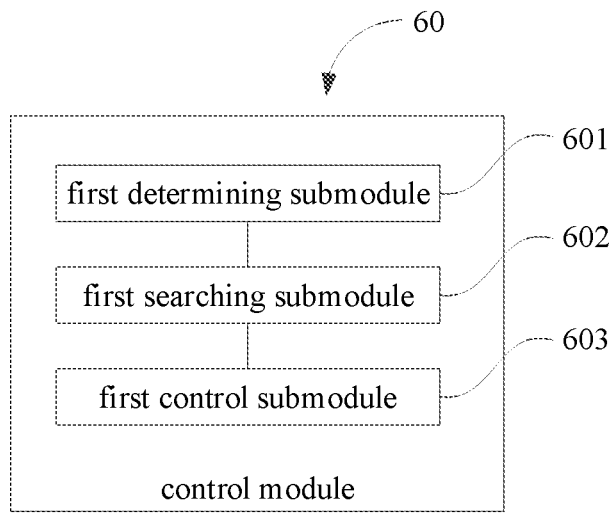
FIG. 5 is a block diagram illustrating a control module according to some embodiments of the present disclosure.

Referring to FIG. 4 and FIG. 5 together, in some embodiments, the electronic device 1000 may include a displayer 300 and an orientation sensor 400. The orientation sensor 400 is configured to sense an orientation of the imaging apparatus 200. The control module 60 may include a first determining submodule 601, a first searching submodule 602, and a first control submodule 603. The first determining submodule 601 is configured to determine a structure type of a current 3D space based on the foreground portion and the orientation. The first searching submodule 602 is configured to, search, in a preset database, a current composition recommendation corresponding to the structure type of the current 3D space. The preset database includes a plurality of foreground types and corresponding composition recommendations. The first control submodule 603 is configured to control the displayer 300 to display the current composition recommendation.

That is, the act in block S601 may be implemented by the first determining submodule 601. The act in block S602 may be implemented by the first searching submodule 602. The act in block S603 may be implemented by the first control submodule 603.

Therefore, the structure type of the current 3D space may be determined based on the foreground portion and the orientation, thereby acquiring the current composition recommendation corresponding to the structure type of the current 3D space, and further assisting the composition.

In detail, the orientation of the imaging apparatus 200 may be understood as an imaging direction of the imaging apparatus 200, such as the imaging apparatus 200 is oriented downward, it indicates that the imaging apparatus 200 is capturing the scene of ground, and the imaging apparatus 200 is oriented upward, it indicates that the imaging apparatus 200 is capturing the scene of sky.

Figure 6:
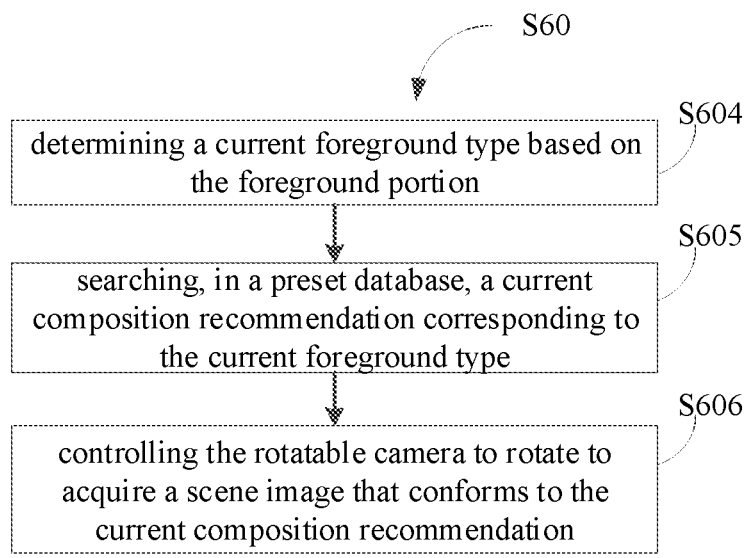
FIG. 6 is a flow chart illustrating a control method according to some embodiments of the present disclosure.
Figure 7:
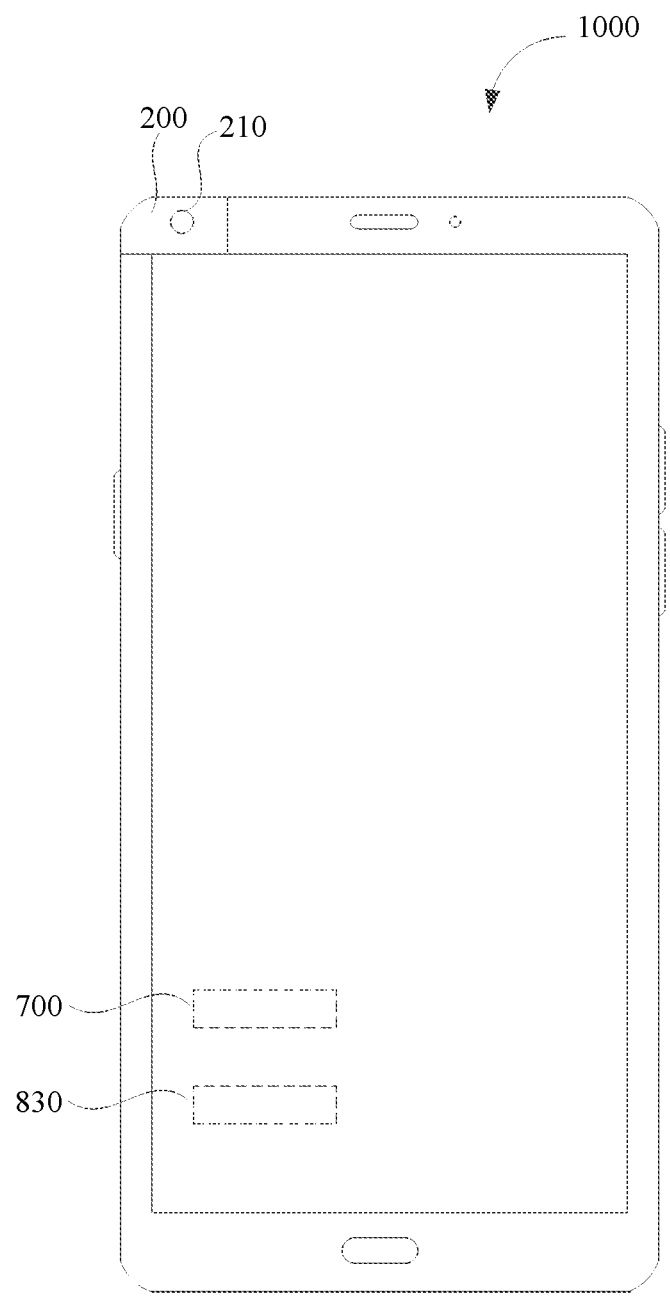
FIG. 7 is a block diagram illustrating an electronic device according to some embodiments of the present disclosure.

Referring to FIG. 6 and FIG. 7 together, in some embodiments, the imaging apparatus 200 may include a rotatable camera 210. The imaging apparatus 200 is configured to collect the scene data. The act in block S60 may include acts in the following blocks.

At block S604, a current foreground type is determined based on the foreground portion.

At block S605, a current composition recommendation corresponding to the current foreground type is searched in a preset database. The preset database includes a plurality of foreground types and corresponding composition recommendations.

At block S606, the rotatable camera 210 is controlled to rotate to acquire a scene image that conforms to the current composition recommendation.

Figure 8:
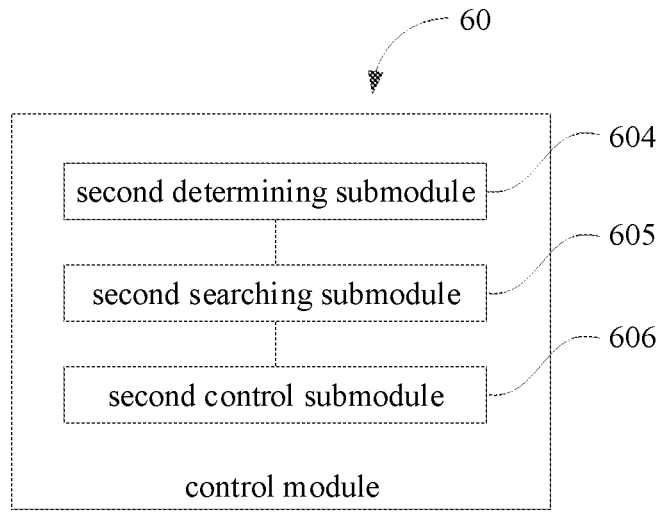
FIG. 8 is a block diagram illustrating a control module according to some embodiments of the present disclosure.

Referring to FIG. 7 and FIG. 8 together, in some embodiments, the imaging apparatus 200 may include a rotatable camera 210. The imaging apparatus 200 is configured to collect the scene data. The control module 60 may include a second determining submodule 604, a second searching submodule 605, and a second control submodule 606. The second determining submodule 604 is configured to determine a current foreground type based on the foreground portion. The second searching submodule 605 is configured to, search, in a preset database, a current composition recommendation corresponding to the current foreground type. The preset database includes a plurality of foreground types and corresponding composition recommendations. The second control submodule 606 is configured to control the rotatable camera 210 to rotate to acquire a scene image that conforms to the current composition recommendation.

That is, the act in block S604 may be implemented by the second determining submodule 604. The act in block S605 may be implemented by the second searching submodule 605. The act in block S606 may be implemented by the second control submodule 606.

Therefore, the current foreground type may be determined based on the depth information, thereby acquiring the current composition recommendation corresponding to the current foreground type and controlling the rotatable camera 210 based on the current composition recommendation to rotate to acquire the scene image that conforms to the current composition recommendation.

Figure 9:
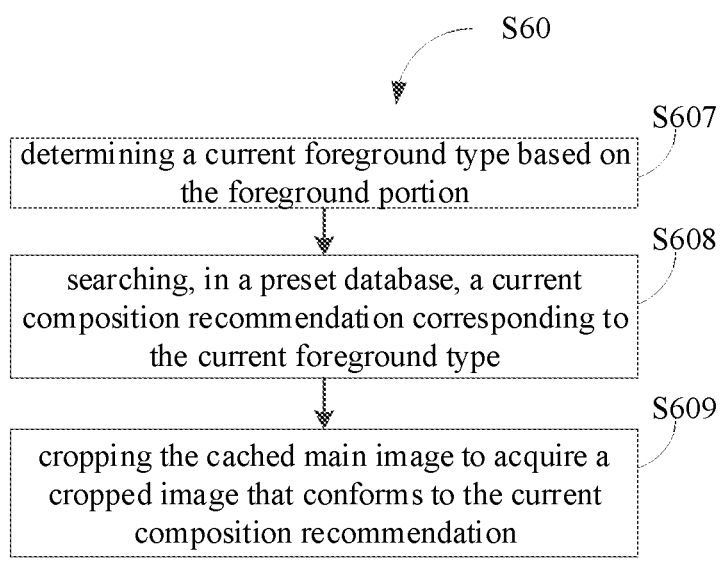
FIG. 9 is a flow chart illustrating a control method according to some embodiments of the present disclosure.
Figure 10:
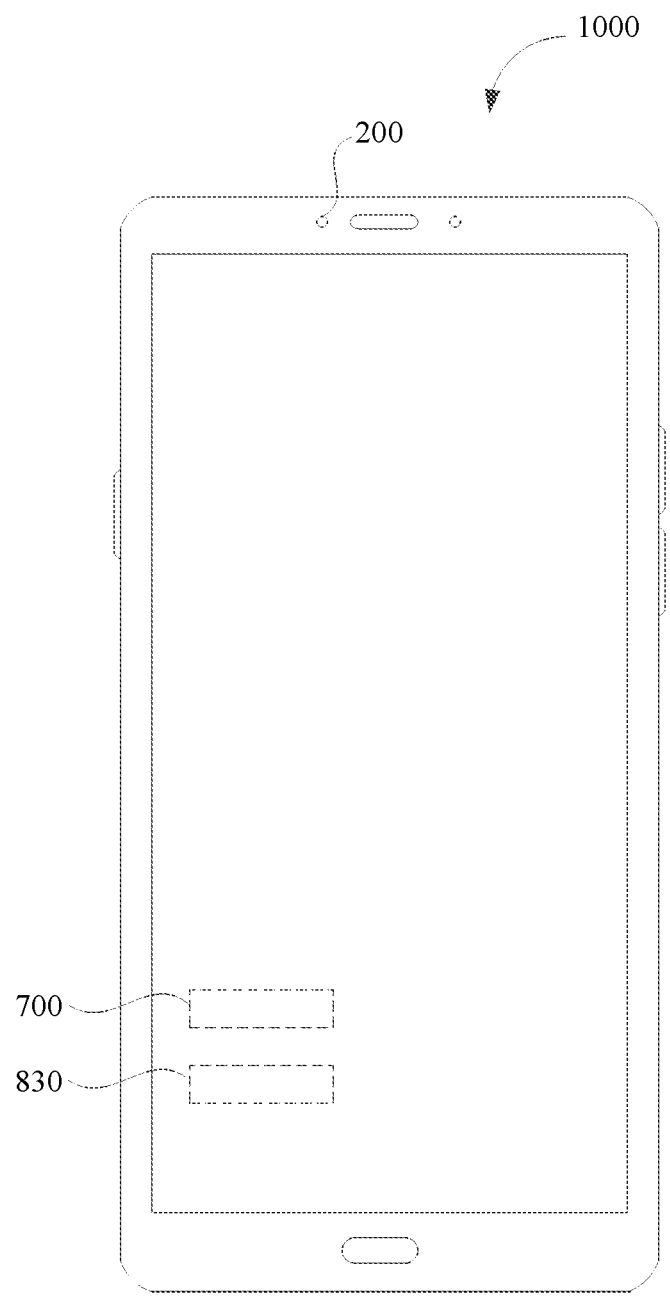
FIG. 10 is a block diagram illustrating an electronic device according to some embodiments of the present disclosure.

Referring to FIG. 9 and FIG. 10 together, in some embodiments, the act in block S60 may include acts in the following blocks.

At block S607, a current foreground type is determined based on the foreground portion.

At block S608, a current composition recommendation corresponding to the current foreground type is searched in a preset database. The preset database includes a plurality of foreground types and corresponding composition recommendations.

At block S609, the cached main image is cropped to acquire a cropped image that conforms to the current composition recommendation.

Figure 11:
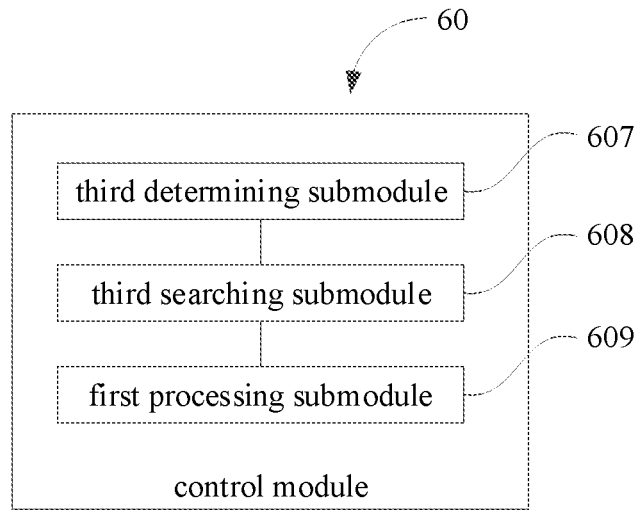
FIG. 11 is a block diagram illustrating a control module according to some embodiments of the present disclosure.

Referring to FIG. 10 and FIG. 11 together, in some embodiments, the control module 60 may include a third determining submodule 607, a third searching submodule 608, and a first processing submodule 609. The third determining submodule 607 is configured to determine a current foreground type based on the foreground portion. The third searching submodule 608 is configured to, search, in a preset database, a current composition recommendation corresponding to the current foreground type. The preset database includes a plurality of foreground types and corresponding composition recommendations. The first processing submodule 609 is configured to crop the cached main image to acquire a cropped image that conforms to the current composition recommendation.

That is, the act in block S607 may be implemented by the third determining submodule 607. The act in block S608 may be implemented by the third searching submodule 608. The act in block S609 may be implemented by the first processing submodule 609.

Therefore, the foreground portion may be employed to determine the current foreground type, thereby acquiring the current composition recommendation corresponding to the current foreground type and cropping the cached main image based on the current composition recommendation. In this way, the image may be cropped without changing the orientation of the lens to make the position of the foreground in the scene to meet requirements of the current composition recommendation, thereby acquiring the cropped image with suitable composition.

Figure 12:
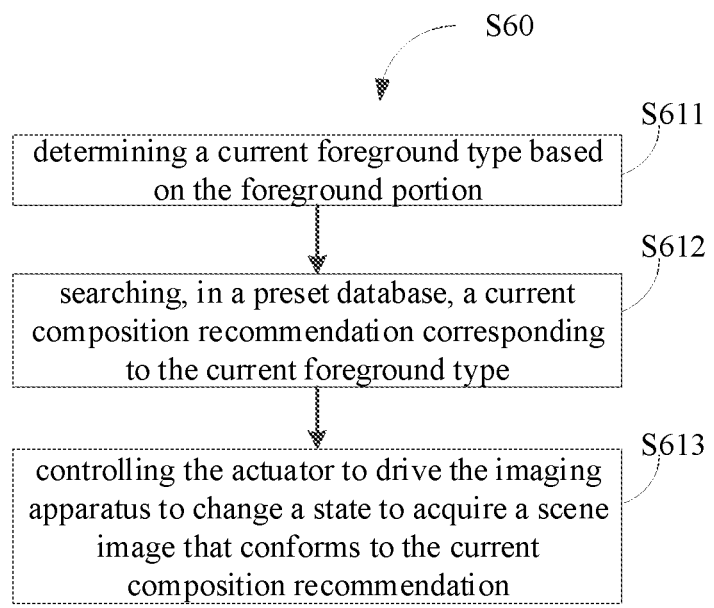
FIG. 12 is a flow chart illustrating a control method according to some embodiments of the present disclosure.
Figure 13:
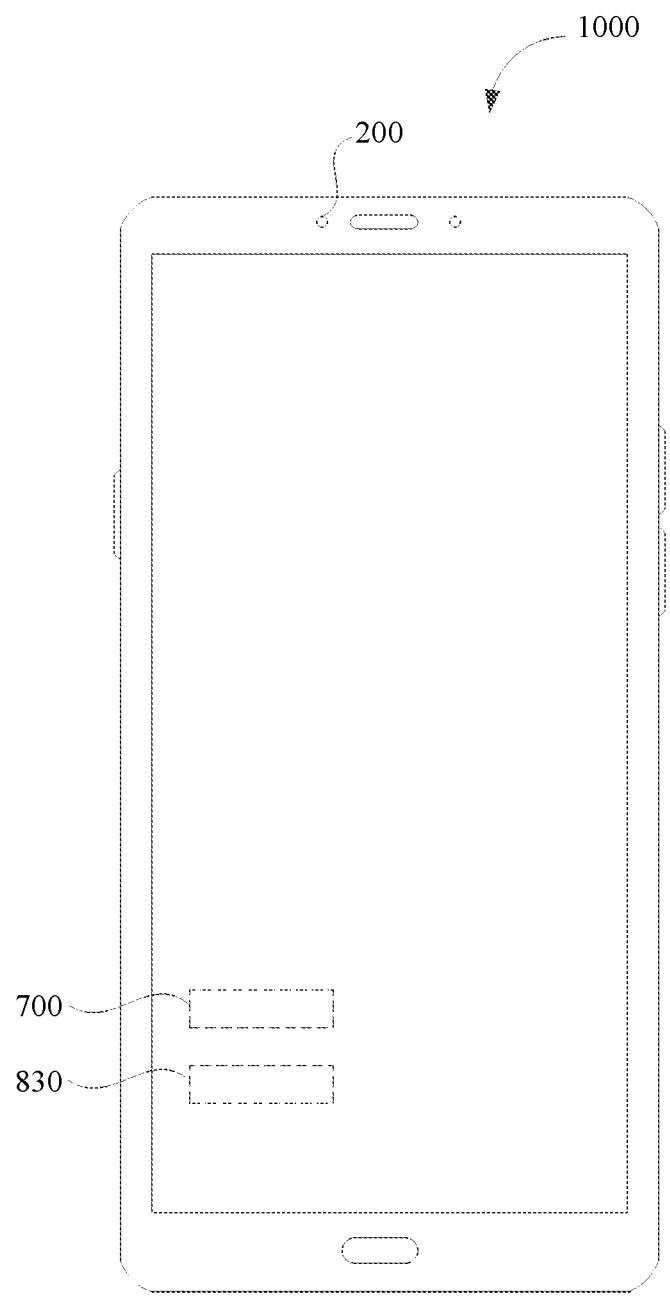
FIG. 13 is a block diagram illustrating an electronic device according to some embodiments of the present disclosure.
Figure 14:
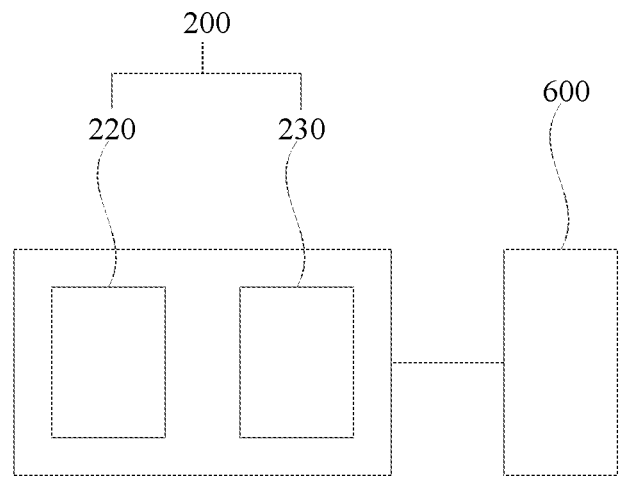
FIG. 14 is a block diagram illustrating a part of an electronic device according to some embodiments of the present disclosure.

Referring to FIGS. 12 to 14 together, in some embodiments, the electronic device 1000 includes an actuator 600 coupled to the imaging apparatus 200. The act in block S60 may include acts in the following blocks.

At block S611, a current foreground type is determined based on the foreground portion.

At block S612, a current composition recommendation corresponding to the current foreground type is searched in a preset database. The preset database includes a plurality of foreground types and corresponding composition recommendations.

At block S613, the actuator 600 is controlled to drive the imaging apparatus 200 to change a state to acquire a scene image that conforms to the current composition recommendation.

Figure 15:
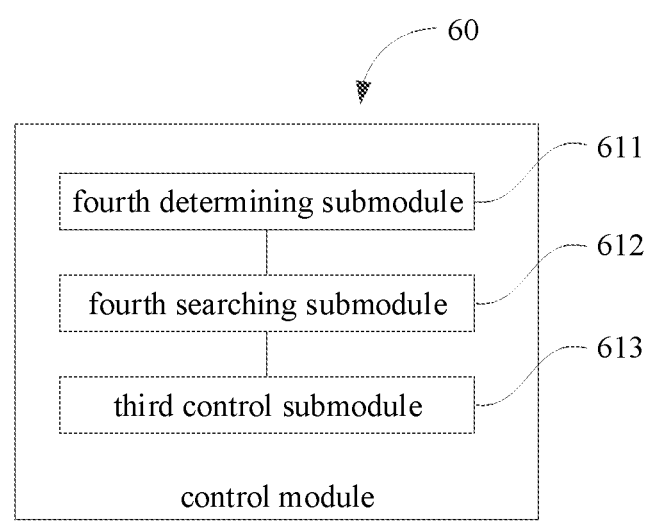
FIG. 15 is a block diagram illustrating a control module according to some embodiments of the present disclosure.

Referring to FIGS. 13 to 15 together, in some embodiments, the electronic device 1000 includes an actuator 600 coupled to the imaging apparatus 200. The control module 60 may include a fourth determining submodule 611, a fourth searching submodule 612, and a third control submodule 613. The fourth determining submodule 611 is configured to determine a current foreground type based on the foreground portion. The fourth searching submodule 612 is configured to, search, in a preset database, a current composition recommendation corresponding to the current foreground type. The preset database includes a plurality of foreground types and corresponding composition recommendations. The third control submodule 613 is configured to control the actuator 600 to drive the imaging apparatus to change a state to acquire a scene image that conforms to the current composition recommendation.

That is, the act in block S611 may be implemented by the fourth determining submodule 611. The act in block S612 may be implemented by the fourth searching submodule 612. The act in block S613 may be implemented by the third control submodule 613.

Therefore, the current foreground type may be determined based on the foreground portion, thereby acquiring the current composition recommendation corresponding to the current foreground type and controlling the actuator 600 to drive the imaging apparatus 200 to change the state to acquire the scene image that conforms to the current composition recommendation.

Figure 16:
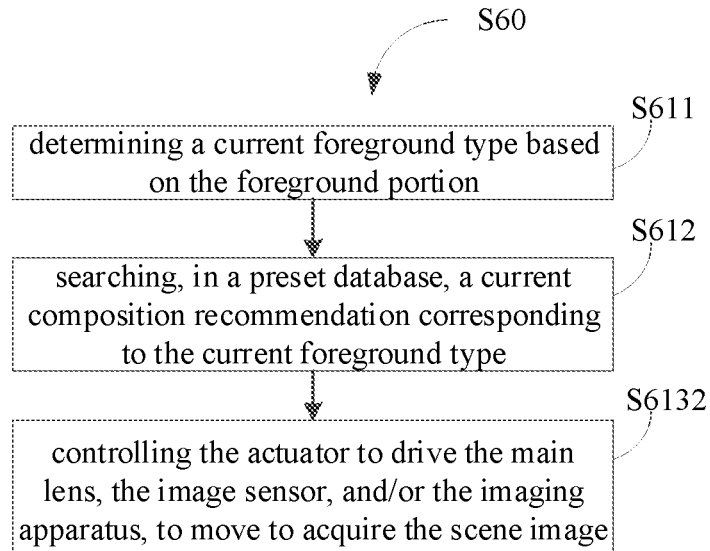
FIG. 16 is a flow chart illustrating a control method according to some embodiments of the present disclosure.

Referring to FIG. 14 and FIG. 16 together, in some embodiments, the imaging apparatus 200 may include a main lens 220 for acquiring an optical image, and an image sensor 230 disposed under the main lens 220 and for converting the optical image into the cached main image. The act in block S613 may include an act in the following block.

At block S6132, the actuator 600 is controlled to drive the main lens 220, the image sensor 230, and/or the imaging apparatus 200, to move to acquire the scene image.

Referring to FIG. 14 and FIG. 15 again, in some embodiments, the imaging apparatus 200 may include a main lens 220 for acquiring an optical image, and an image sensor 230 disposed under the main lens 220 and for converting the optical image into the cached main image. The third control submodule 613 is further configured to control the actuator 600 to drive the main lens 220, the image sensor 230, and/or the imaging apparatus 200, to move to acquire the scene image.

That is, the act in block S6132 may be implemented by the third control submodule 613.

Therefore, the imaging apparatus 200 may be automatically controlled by the actuator 600 to acquire the scene image conforming to the current composition, thereby reducing the complexity of the manual operation and avoiding the error that may be caused by the manual operation.

In detail, the control apparatus 100 may control the actuator 600 to drive the entire imaging apparatus 200 or a portion thereof to move, thereby realizing the function of automatically adjusting and changing the scene image. For example, the main lens 220 may be driven to move, or the image sensor 230 may be driven to move, or the entire imaging apparatus 200 may be driven to move, which is not limited herein. In the embodiment of the present disclosure, the control apparatus 100 controls the actuator 600 to drive the image sensor 230 to move.

Figure 17:
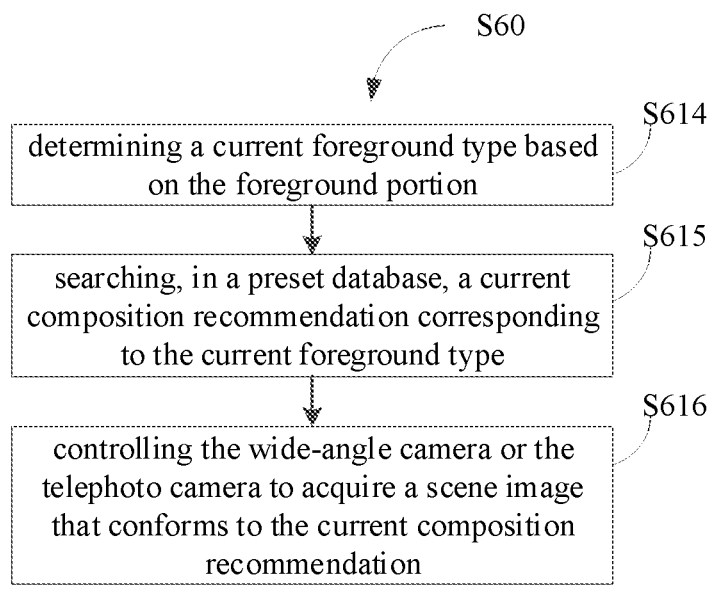
FIG. 17 is a flow chart illustrating a control method according to some embodiments of the present disclosure.
Figure 18:
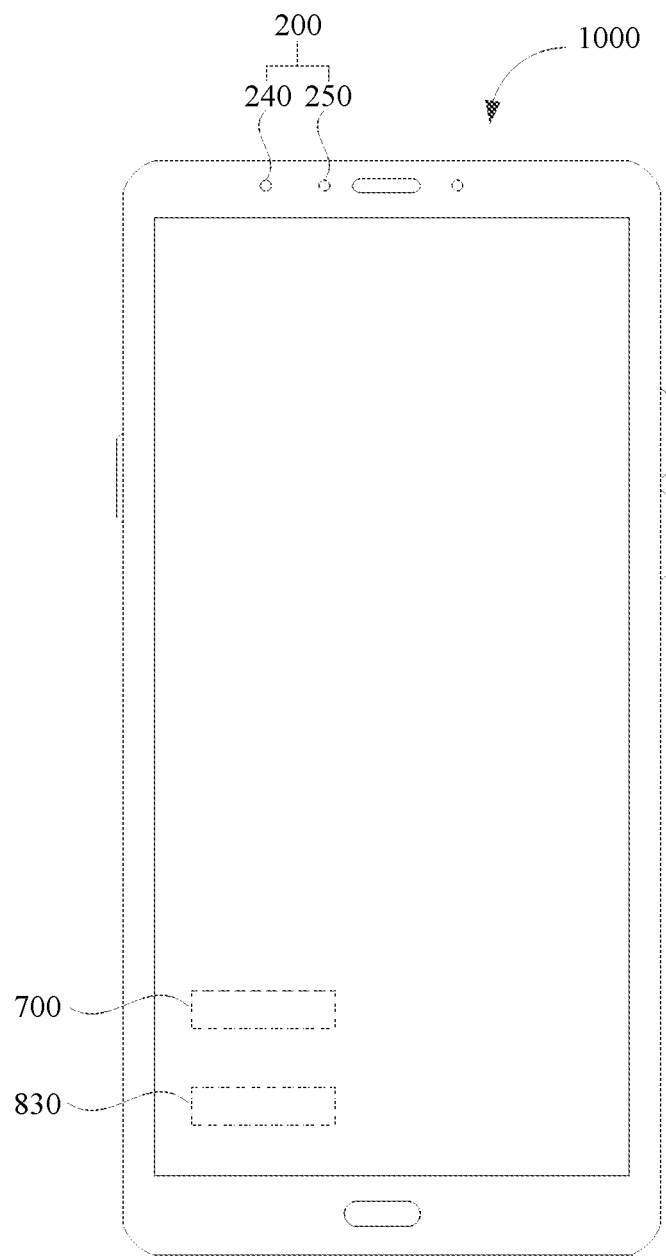
FIG. 18 is a block diagram illustrating an electronic device according to some embodiments of the present disclosure.

Referring to FIG. 17 and FIG. 18 together, in some embodiments, the imaging apparatus 200 may include a wide-angle camera 240 and a telephoto camera 250. The act in block S60 may include acts in the following blocks.

At block S614, a current foreground type is determined based on the foreground portion.

At block S615, a current composition recommendation corresponding to the current foreground type is searched in a preset database. The preset database includes a plurality of foreground types and corresponding composition recommendations.

At block S616, the wide-angle camera 240 or the telephoto camera 250 is controlled to acquire a scene image that conforms to the current composition recommendation.

Figure 19:
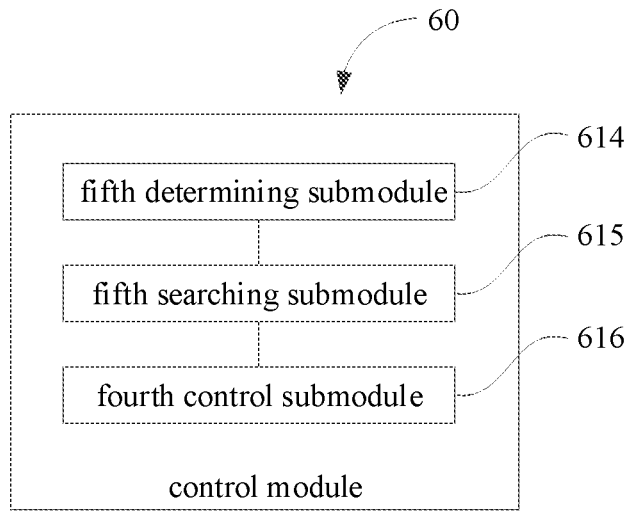
FIG. 19 is a block diagram illustrating a control module according to some embodiments of the present disclosure.
Figure 20:
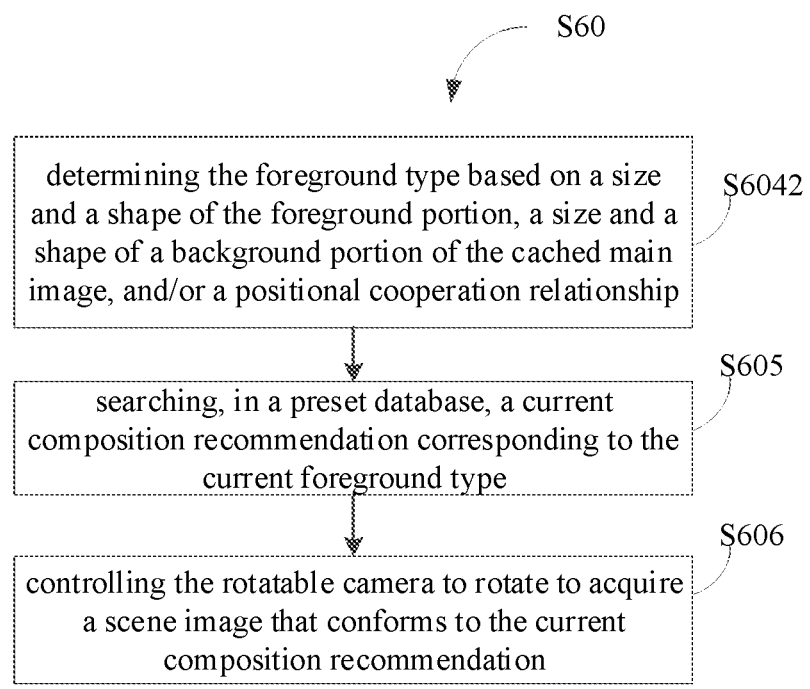
FIG. 20 is a flow chart illustrating a control method according to some embodiments of the present disclosure.
Figure 21:
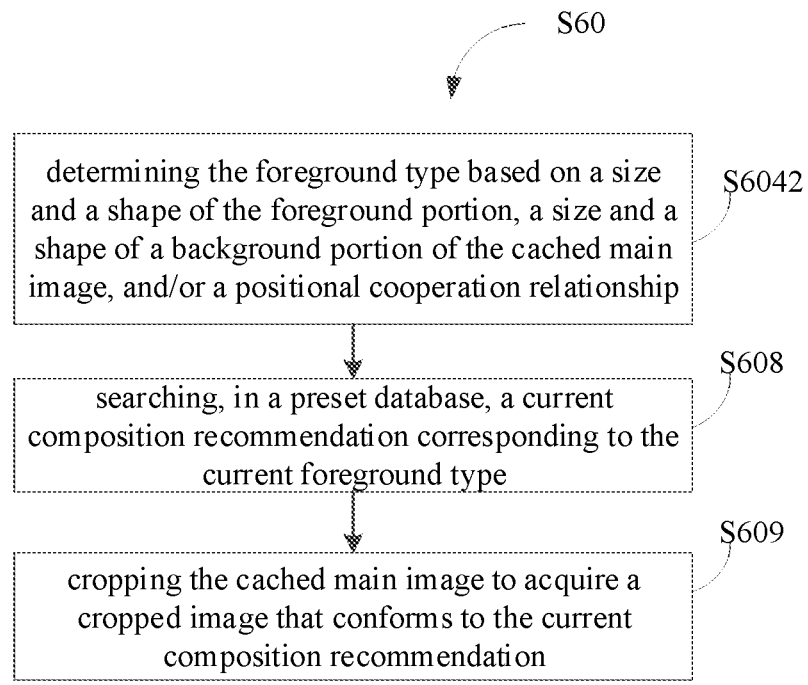
FIG. 21 is a flow chart illustrating a control method according to some embodiments of the present disclosure.
Figure 22:
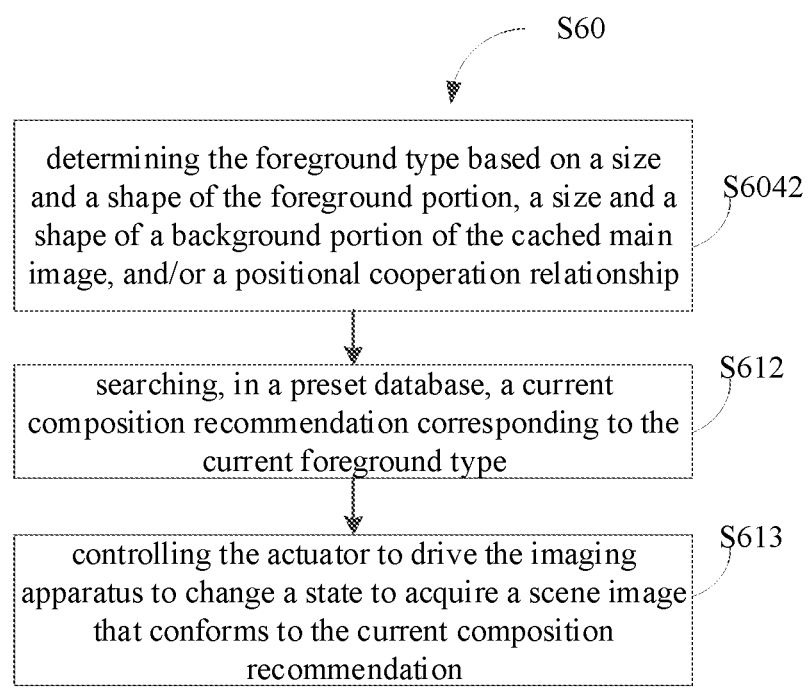
FIG. 22 is a flow chart illustrating a control method according to some embodiments of the present disclosure.
Figure 23:
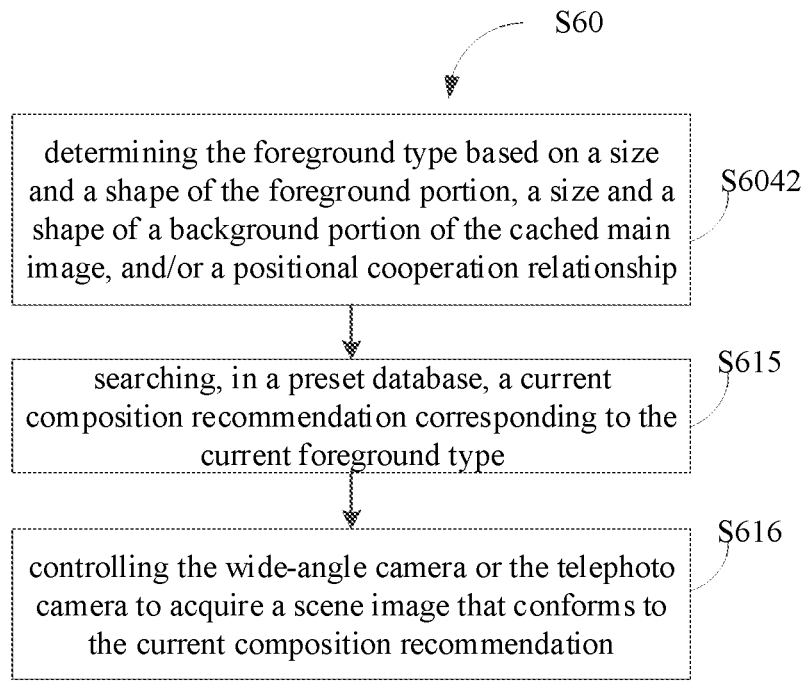
FIG. 23 is a flow chart illustrating a control method according to some embodiments of the present disclosure.

Referring to FIG. 18 and FIG. 19 together, in some embodiments, the imaging apparatus 200 may include a wide-angle camera 240 and a telephoto camera 250. The control module 60 may include a fifth determining submodule 614, a fifth searching submodule 615, and a fourth control submodule 616. The fifth determining submodule 614 is configured to determine a current foreground type based on the foreground portion. The fifth searching submodule 615 is configured to, search, in a preset database, a current composition recommendation corresponding to the current foreground type. The preset database includes a plurality of foreground types and corresponding composition recommendations. The fourth control submodule 616 is configured to control the wide-angle camera 240 or the telephoto camera 250 to acquire a scene image that conforms to the current composition recommendation.

That is, the act in block S614 may be implemented by the fifth determining submodule 614. The act in block S615 may be implemented by the fifth searching submodule 615. The act in block S616 may be implemented by the fourth control submodule 616.

Therefore, the current foreground type may be determined based on the foreground portion, thereby acquiring the current composition recommendation corresponding to the current foreground type and controlling the wide-angle camera 240 or the telephoto camera 250 to acquire the scene image that conforms to the current composition recommendation.

Referring to FIGS. 20 to 23 together, in some embodiments, the act in block S604, the act in block S607, the act in block S611 or the act in block S614 may include an act in the following block.

At block S6042, the foreground type is determined based on a size and a shape of the foreground portion, a size and a shape of a background portion of the cached main image, and/or a positional cooperation relationship.

Referring to FIG. 8, FIG. 11, FIG. 15, and FIG. 19 again, in some embodiments, the second determining submodule 604, the third determining submodule 607, the fourth determining submodule 611, or the fifth determining submodule 614 is further configured to determine the foreground type based on a size and a shape of the foreground portion, a size and a shape of a background portion of the cached main image, and/or a positional cooperation relationship.

That is, the act in block S6042 may be implemented by the second determining submodule 604, the third determining submodule 607, the fourth determining submodule 611, or the fifth determining submodule 614.

Therefore, the foreground type may be determined by the foreground portion or the cooperation relationship between the foreground portion and the background portion.

It is to be understood that the foreground portion, as the main portion of the image, may be the most important determiner when determining the foreground type. That is, the foreground type is determined by characteristics of the size, shape, content and the like of the foreground portion.

In some embodiments, the foreground type includes a symmetrical type, a sudoku-pattern type, a diagonal type, a triangle type, and the like. For example, if the foreground portion includes two objects that are bilaterally symmetric, the corresponding foreground type may be the symmetrical type.

In some embodiments, in order to improve the composition quality, when determining the foreground type, the background portion or the cooperation relationship between the foreground portion and the background portion may also be referred to, thereby acquiring the more accurate foreground type, and the better composition recommendation.

Referring to FIG. 4, FIG. 7, FIG. 10, FIG. 13 and FIG. 18 again, in some embodiments, the electronic device 1000 includes a communication module 700 in communication with a cloud and/or a memory 830. The preset database is stored in the memory 830 and/or the cloud.

Therefore, the composition recommendation may be acquired in a variety of ways. It may reduce the working time of the electronic device 1000 by storing the preset database in the memory 830 of the electronic device 1000, thereby improving stability. It may save hardware resources by storing the preset database in the cloud, thereby avoiding consuming a large amount of storage spaces of the electronic device 1000, and further thereby updating the corresponding preset database in real-time.

Figure 24:
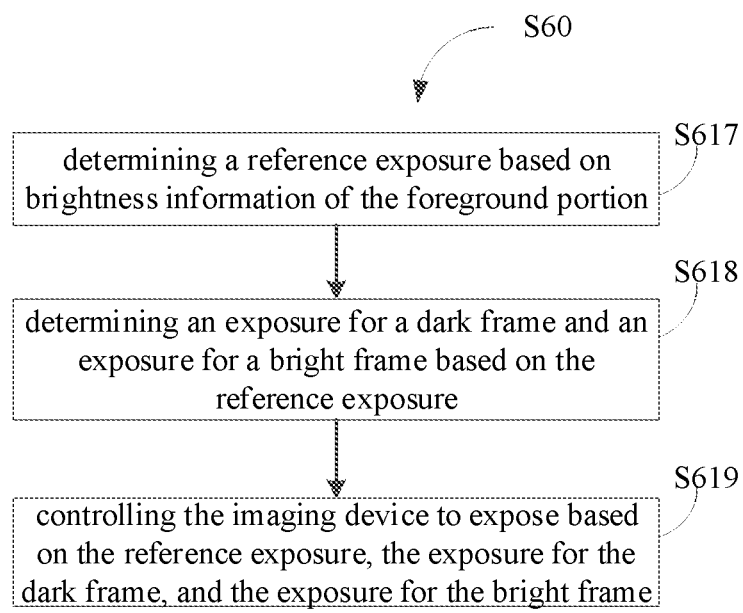
FIG. 24 is a flow chart illustrating a control method according to some embodiments of the present disclosure.

Referring to FIG. 24, in some embodiments, the act in block S60 may include acts in the following blocks.

At block S617, a reference exposure is determined based on brightness information of the foreground portion.

At block S618, an exposure for a dark frame and an exposure for a bright frame are determined based on the reference exposure. The exposure for the dark frame is smaller than the reference exposure. The exposure for the bright frame is greater than the reference exposure.

At block S619, the imaging device 200 is controlled to expose based on the reference exposure, the exposure for the dark frame, and the exposure for the bright frame.

Figure 25:
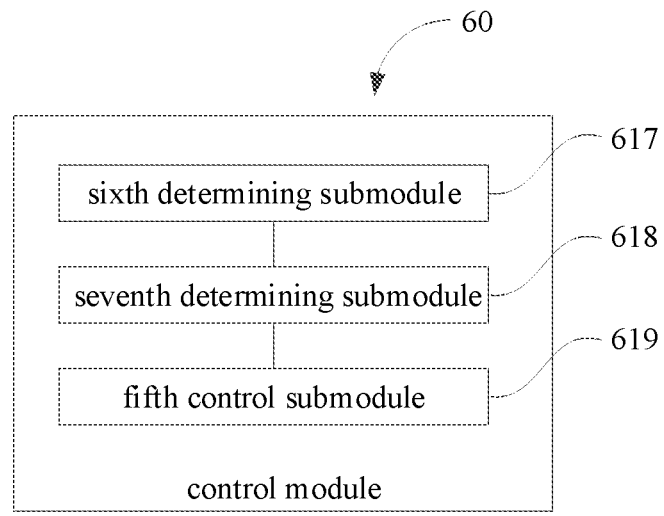
FIG. 25 is a block diagram illustrating a control module according to some embodiments of the present disclosure.

Referring to FIG. 25, in some embodiments, the control module 60 may include a sixth determining submodule 617, a seventh determining submodule 618, and a fifth control submodule 619. The sixth determining submodule 617 is configured to determine a reference exposure based on brightness information of the foreground portion. The seventh determining submodule 618 is configured to determine an exposure for a dark frame and an exposure for a bright frame based on the reference exposure. The exposure for the dark frame is smaller than the reference exposure. The exposure for the bright frame is greater than the reference exposure. The fifth control submodule 619 is configured to control the imaging device 200 to expose based on the reference exposure, the exposure for the dark frame, and the exposure for the bright frame.

That is, the act in block S617 may be implemented by the sixth determining submodule 617. The act in block S618 may be implemented by the seventh determining submodule 618. The act in block S619 may be implemented by the fifth control submodule 619.

Therefore, the foreground portion may be employed as the main body of the image. The reference exposure is determined based on the brightness information of the main body, and the exposure for the dark frame and the exposure for the bright frame may be determined based on the reference exposure. The imaging device 200 may be controlled to expose based on the reference exposure, the exposure for the dark frame, and the exposure for the bright frame, to acquire a plurality of images, so that a wide-dynamic-range image with a clear main body and a reasonable dynamic range may be acquired by the image processing method.

It is to be understood that the reference exposure may be the exposure amount for normal exposed image. It may improve the definition of the foreground portion, i.e., the main body based on the reference exposure acquired based on the brightness information of the foreground portion, thereby making the normal exposed image more ornamental.

Figure 26:
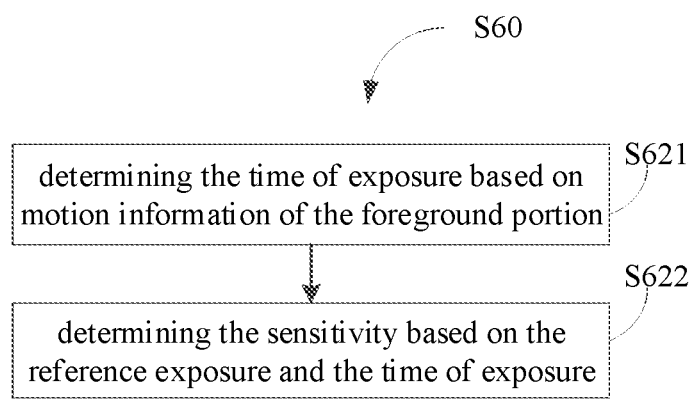
FIG. 26 is a flow chart illustrating a control method according to some embodiments of the present disclosure.

Referring to FIG. 26, in some embodiments, the reference exposure includes a time of exposure, and a sensitivity of the imaging apparatus 200. The act in block S60 may include acts in the following blocks.

At block S621, the time of exposure is determined based on motion information of the foreground portion.

At block S622, the sensitivity is determined based on the reference exposure and the time of exposure.

Figure 27:
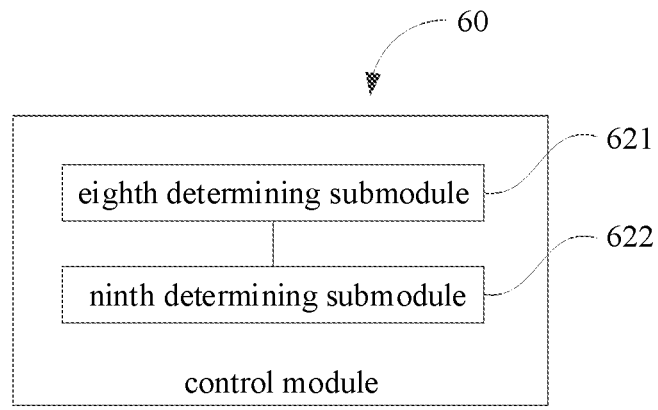
FIG. 27 is a block diagram illustrating a control module according to some embodiments of the present disclosure.

Referring to FIG. 27, in some embodiments, the reference exposure includes a time of exposure, and a sensitivity of the imaging apparatus 200. The control module 60 may include an eighth determining submodule 621 and a ninth determining submodule 622. The eighth determining submodule 621 is configured to determine the time of exposure based on motion information of the foreground portion. The ninth determining submodule 622 is configured to determine the sensitivity based on the reference exposure and the time of exposure.

That is, the act in block S621 may be implemented by the eighth determining submodule 621. The act in block S622 may be implemented by the ninth determining submodule 622.

Therefore, the time of exposure and the sensitivity of the imaging apparatus 200 may be determined based on the motion information of the foreground portion.

It is to be understood that, when the foreground portion is in motion, it may reduce the time of exposure to ensure the clarity of the foreground portion and avoid ghosting and the like, and it may increase the sensitivity so that the reference exposure is substantially not changed to ensure the brightness of the foreground portion. When the foreground portion is at rest, in order to avoid noise caused by too much sensitivity, the sensitivity may be appropriately lowered and the time of exposure may be increased.

Figure 28:
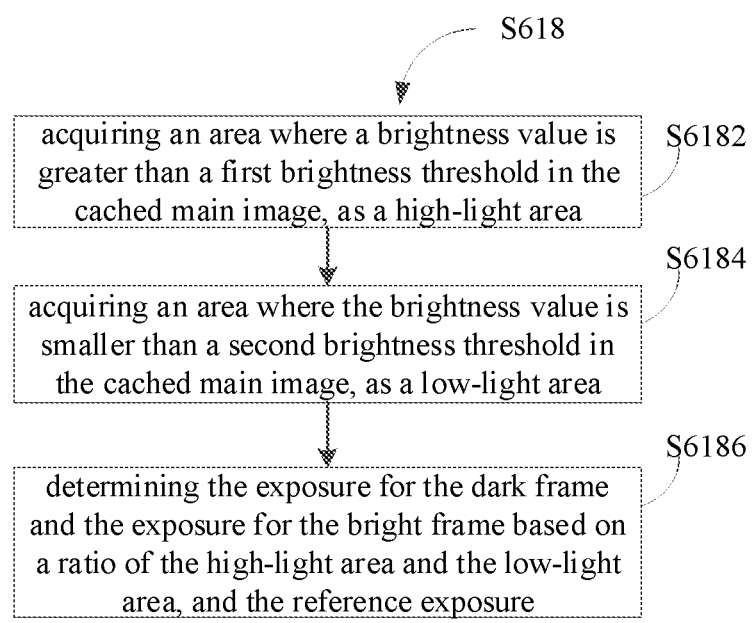
FIG. 28 is a flow chart illustrating a control method according to some embodiments of the present disclosure.

Referring to FIG. 28, in some embodiments, the act in block S628 may include acts in the following blocks.

At block S6182, an area where a brightness value is greater than a first brightness threshold in the cached main image is acquired as a high-light area.

At block S6184, an area where the brightness value is smaller than a second brightness threshold in the cached main image is acquired as a low-light area. The first brightness threshold is greater than the second brightness threshold.

At block S6186, the exposure for the dark frame and the exposure for the bright frame are determined based on a ratio of the high-light area and the low-light area, and the reference exposure.

Figure 29:
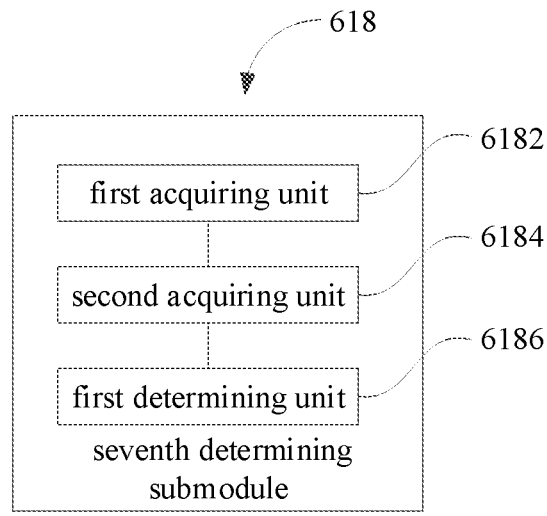
FIG. 29 is a block diagram illustrating a seventh determining submodule according to some embodiments of the present disclosure.

Referring to FIG. 29, in some embodiments, the seventh determining submodule 618 may include a first acquiring unit 6182, a second acquiring unit 6184, and a first determining unit 6186. The first acquiring unit 6182 is configured to acquire an area where a brightness value is greater than a first brightness threshold in the cached main image, as a high-light area. The second acquiring unit 6184 is configured to acquire an area where the brightness value is smaller than a second brightness threshold in the cached main image, as a low-light area. The first brightness threshold is greater than the second brightness threshold. The first determining unit 6186 is configured to determine the exposure for the dark frame and the exposure for the bright frame based on a ratio of the high-light area and the low-light area, and the reference exposure.

That is, the act in block S6182 may be implemented by the first acquiring unit 6182. The act in block S6184 may be implemented by the second acquiring unit 6184. The act in block S6186 may be implemented by the first determining unit 6186.

Therefore, the exposure for the dark frame and the exposure for the bright frame may be determined based on the ratio of the high-light area and the low-light area in the cached main image, and the reference exposure.

It is to be understood that, the exposure for the dark frame may be the exposure amount for the underexposed image, and the exposure for the bright frame may be the exposure amount for the overexposed image. When the proportion occupied by the high-light area is large, the brightness of the image is high, and the exposure for the dark frame and/or the exposure for the bright frame may be appropriately reduced. When the proportion occupied by the low-light area is large, the brightness of the image is low, and the exposure for the dark frame and/or the exposure for the bright frame may be appropriately increased. Therefore, the appropriate exposure for the dark frame and the appropriate exposure for the bright frame may be determined based on actual conditions.

In some embodiments, the manner of determining the exposure for the dark frame and the exposure for the bright frame based on the ratio of the high-light area and the low-light area, may determine the exposure for the dark frame and the exposure for the bright frame through pre-stored ratio relationships of high-light and low-light. For example, the electronic device 1000 may acquire preferred exposures for the dark frame and preferred exposures for the bright frame corresponding to ratios of the high-light area and the low-light area after a large amount of data and experiments before leaving the factory, and stores these proportional relationships in the electronic device 1000. Therefore, the exposure for the dark frame and the exposure for the bright frame may be determined quickly by determining the ratio.

Figure 30:
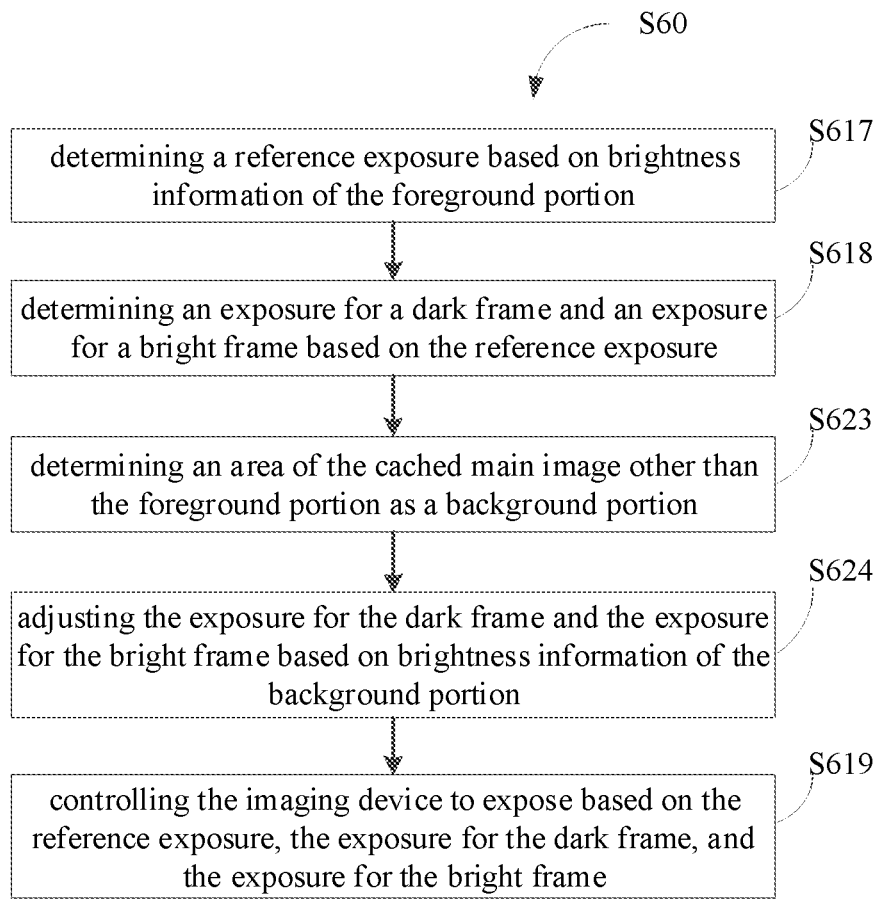
FIG. 30 is a flow chart illustrating a control method according to some embodiments of the present disclosure.

Referring to FIG. 30, in some embodiments, the act in block S60 may include acts in the following blocks.

At block S623, an area of the cached main image other than the foreground portion is determined as a background portion.

At block S624, the exposure for the dark frame and the exposure for the bright frame are adjusted based on brightness information of the background portion.

Figure 31:
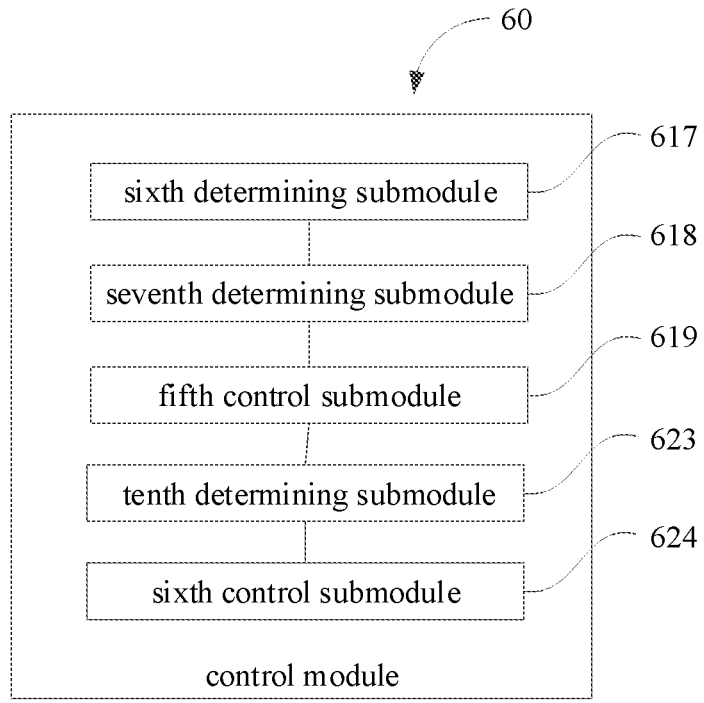
FIG. 31 is a block diagram illustrating a control module according to some embodiments of the present disclosure.

Referring to FIG. 31, in some embodiments, the control module 60 may include a tenth determining submodule 623 and a sixth control submodule 624. The tenth determining submodule 623 is configured to determine an area of the cached main image other than the foreground portion as a background portion. The sixth control submodule 624 is configured to adjust the exposure for the dark frame and the exposure for the bright frame based on brightness information of the background portion.

That is, the act in block S623 may be implemented by the tenth determining submodule 623. The act in block S624 may be implemented by the sixth control submodule 624.

Therefore, the exposure for the dark frame and the exposure for the bright frame may be adjusted based on the brightness information of the background portion.

It is to be understood that the background portion is less important than the foreground portion, that is, the main body. If the area where the brightness is the smallest or the largest in the cached main image is in the background portion, the exposure for the dark frame and the exposure for the bright frame may be adjusted appropriately. Thereby, the image acquired by the imaging apparatus 200 exposing, has a better contrast. For example, when the area where the brightness is the smallest in the cached main image is in the background portion, the exposure for the dark frame may be reduced, to make the contrast of the overexposed image suitable, and to reduce the noise of the background portion of the overexposed image.

Figure 32:
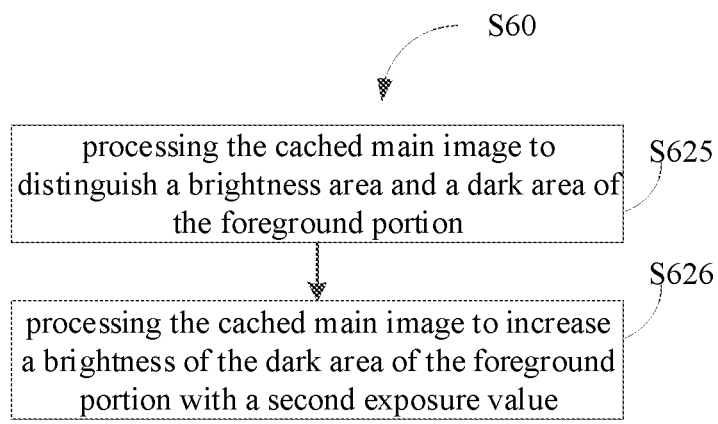
FIG. 32 is a flow chart illustrating a control method according to some embodiments of the present disclosure.

Referring to FIG. 32, in some embodiments, the cached main image includes a first exposure value. The act in block S60 may include acts in the following blocks.

At block S625, the cached main image is processed to distinguish a brightness area and a dark area of the foreground portion.

At block S626, the cached main image is processed to increase a brightness of the dark area of the foreground portion with a second exposure value.

Figure 33:
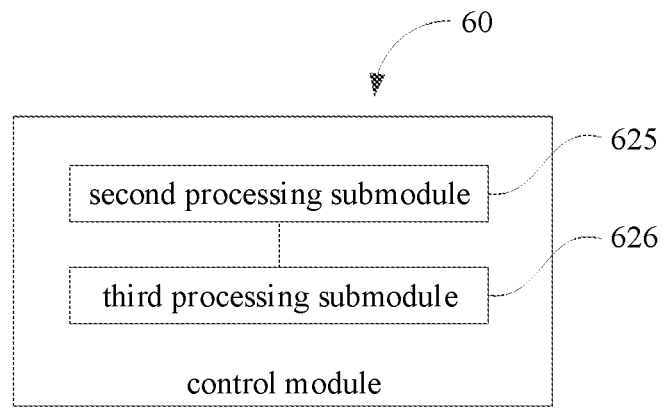
FIG. 33 is a block diagram illustrating a control module according to some embodiments of the present disclosure.

Referring to FIG. 33, in some embodiments, the cached main image includes a first exposure value. The control module 60 may include a second processing submodule 625 and a third processing submodule 626. The second processing submodule 625 is configured to process the cached main image to distinguish a brightness area and a dark area of the foreground portion. The third processing submodule 626 is configured to process the cached main image to increase a brightness of the dark area of the foreground portion with a second exposure value.

That is, the act in block S625 may be implemented by the second processing submodule 625. The act in block S626 act in block S626 by the third processing submodule 626.

Therefore, the brightness of the foreground portion may be improved by the image processing method, thereby acquiring a wide-dynamic-range image in which the foreground portion is highlighted.

Figure 34:
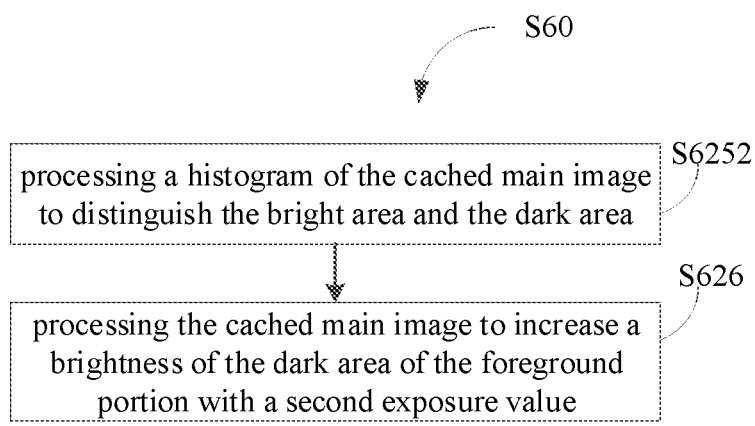
FIG. 34 is a flow chart illustrating a control method according to some embodiments of the present disclosure.

Referring to FIG. 34, in some embodiments, the act in block S625 may include an act in the following block.

At block S6252, a histogram of the cached main image is processed to distinguish the bright area and the dark area.

Referring to FIG. 33 again, in some embodiments, the second processing submodule 625 is further configured to process a histogram of the cached main image to distinguish the bright area and the dark area.

That is, the act in block S6252 may be implemented by the second processing submodule 625.

Therefore, the bright area and the dark area may be quickly distinguished by processing the histogram of the cached main image.

In detail, a horizontal axis of the histogram of the cached main image represents an increase in brightness from left to right, and a vertical axis represents an increase in the number of pixels at a certain brightness from bottom to top. The range of brightness is 0-255, which means that it is from black to white. The higher the peak at a certain point, the more pixels there are at this brightness. In other words, the brightness histogram may reflect the brightness of the image as a whole. In detail, for the cached main image, if it is desired to distinguish the bright area and the dark area of the foreground portion, the foreground portion may be divided into, for example, 3*3 or 5*5 sub-areas, and the histogram of each sub-area may be processed to know the brightness of each sub-area, thereby distinguishing the bright area and the dark area of the foreground portion.

Figure 35:
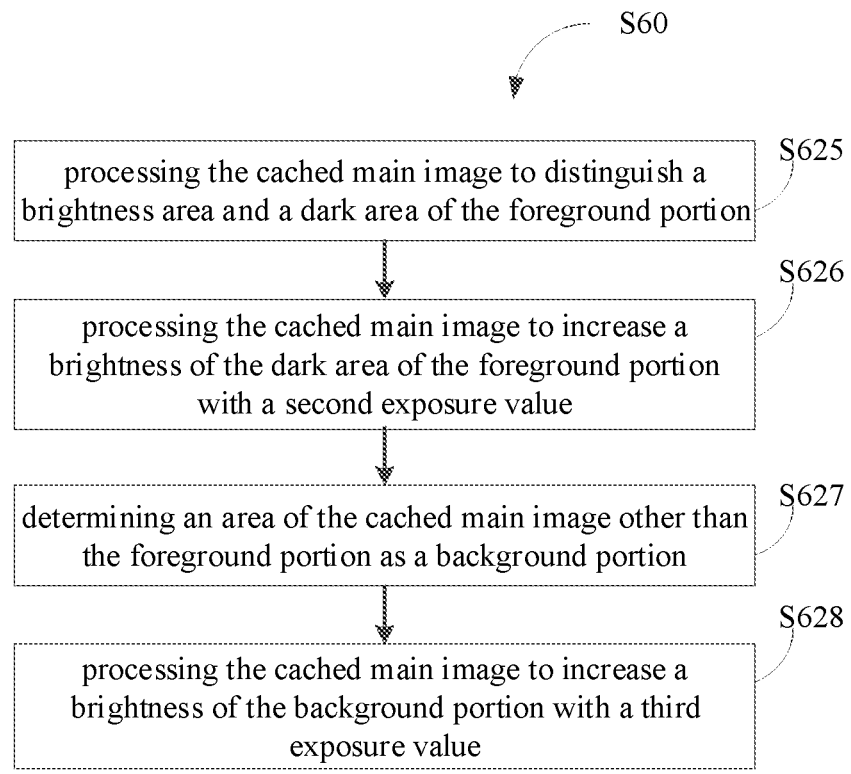
FIG. 35 is a flow chart illustrating a control method according to some embodiments of the present disclosure.

Referring to FIG. 35, in some embodiments, the act in block S60 may include acts in the following blocks.

At block S627, an area of the cached main image other than the foreground portion is determined as a background portion.

At block S628, the cached main image is processed to increase a brightness of the background portion with a third exposure value that is greater than the first exposure value and less than the second exposure value.

Figure 36:
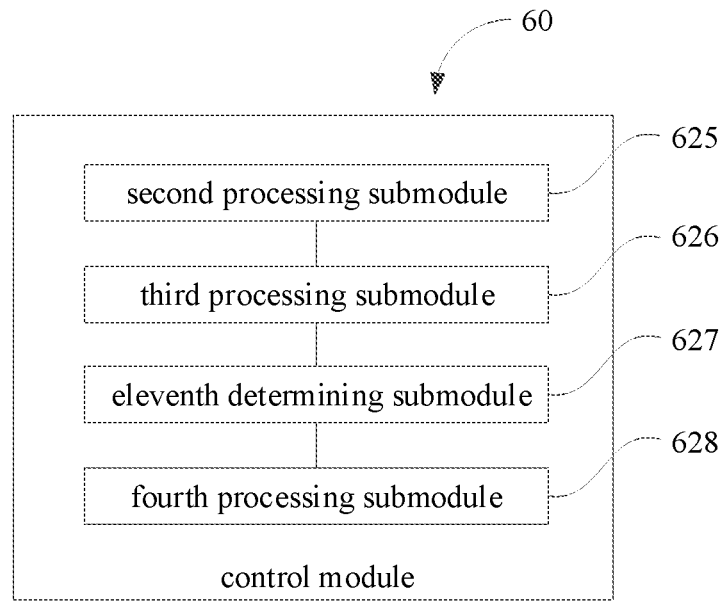
FIG. 36 is a block diagram illustrating a control module according to some embodiments of the present disclosure.

Referring to FIG. 36, in some embodiments, the control module 60 may include an eleventh determining submodule 627 and a fourth processing submodule 628. The eleventh determining submodule 627 is configured to determine an area of the cached main image other than the foreground portion as a background portion. The fourth processing submodule 628 is configured to process the cached main image to increase a brightness of the background portion with a third exposure value that is greater than the first exposure value and less than the second exposure value.

That is, the act in block S627 may be implemented by the eleventh determining submodule 627. The act in block S628 may be implemented by the fourth processing submodule 628.

Therefore, the brightness of the background portion may be improved, and the brightness increased in the background portion is less than the brightness increased in the foreground portion and/or the dark area of the foreground portion. That is, the brightness of the foreground portion and the brightness of the background portion may be increased by different amplitudes. The foreground portion is clear. The brightness of the background portion is less increased, so that the noise is better controlled, and the overall contrast of the image is also better.

Figure 37:
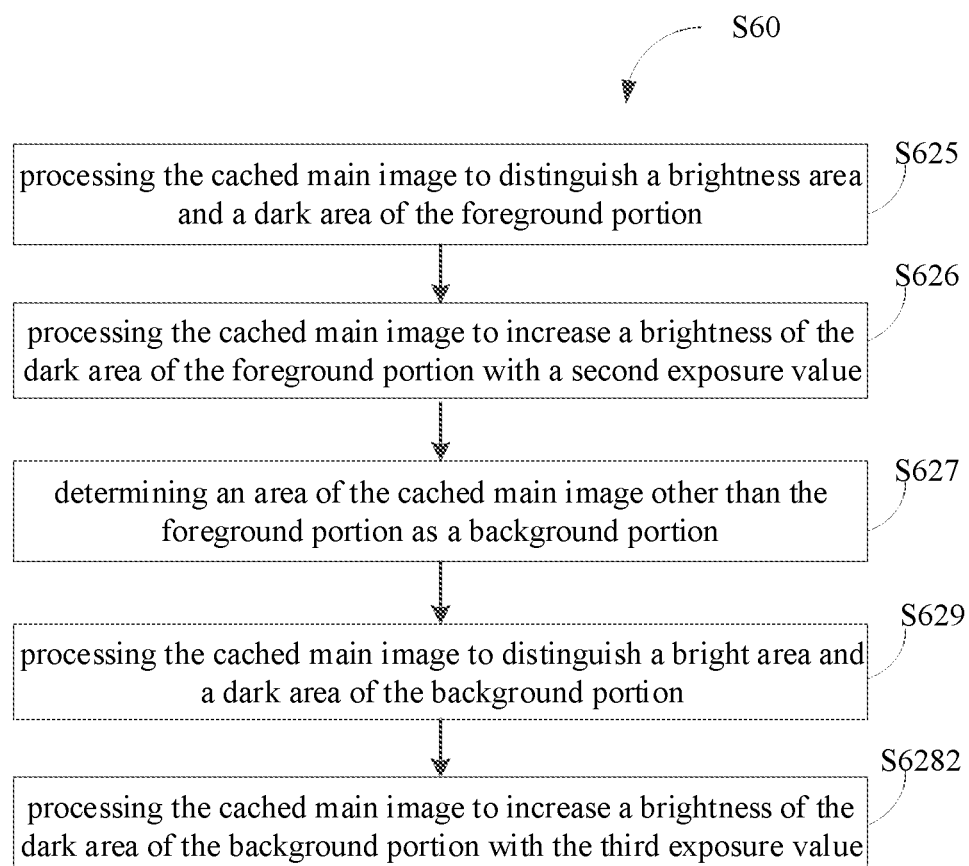
FIG. 37 is a flow chart illustrating a control method according to some embodiments of the present disclosure.

Referring to FIG. 37, in some embodiments, the act in block S60 may include an act in the following block.

At block S629, the cached main image is processed to distinguish a bright area and a dark area of the background portion.

The act in block S628 may include an act in the following block.

At block S6282, the cached main image is processed to increase a brightness of the dark area of the background portion with the third exposure value.

Figure 38:
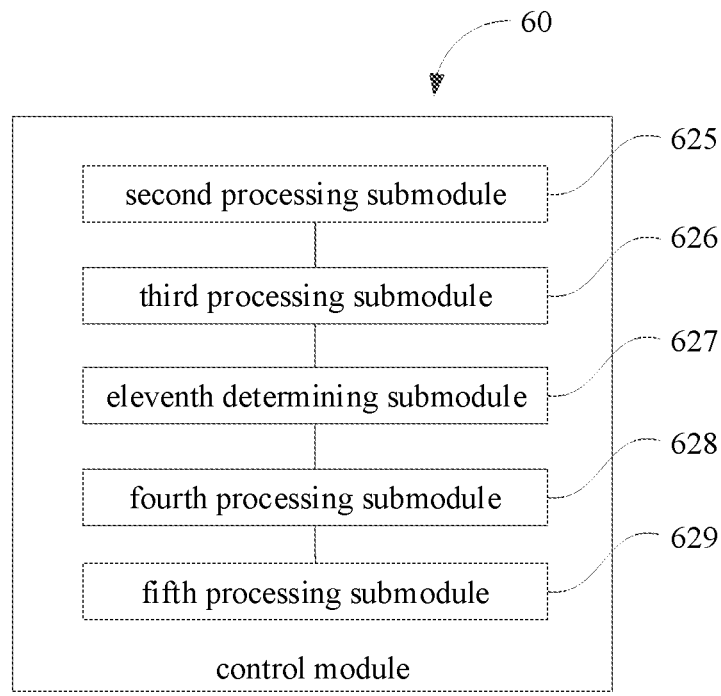
FIG. 38 is a block diagram illustrating a control module according to some embodiments of the present disclosure.

Referring to FIG. 38, in some embodiments, the control module 60 may include a fifth processing submodule 629. The fifth processing submodule 629 is configured to process the cached main image to distinguish a bright area and a dark area of the background portion. The fourth processing submodule 628 is further configured to process the cached main image to increase the brightness of the dark area of the background portion with the third exposure value.

That is, the act in block S629 may be implemented by the fifth processing submodule 629. The act in block S6282 may be implemented by the fourth processing submodule 628.

Similar to the foreground portion, the background portion of the image usually includes a bright area and a dark area. Generally, the limited brightness rang of the image is 8 bits, that is, the data range is 0-255, so that the bright area and the dark area may be determined based on the numerical range.

It is to be understood that if the brightness is increased by not distinguishing for the background portion, the noise of the dark area of the background portion may be excessively large and the overall contrast of the image may be lowered.

Figure 39:
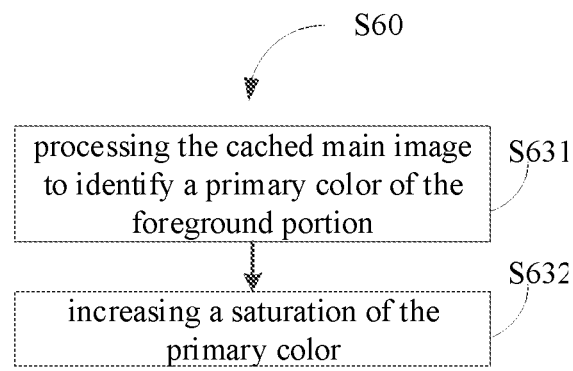
FIG. 39 is a flow chart illustrating a control method according to some embodiments of the present disclosure.

Referring to FIG. 39, in some embodiments, the act in block S60 may include acts in the following blocks.

At block S631, the cached main image is processed to identify a primary color of the foreground portion.

At block S632, a saturation of the primary color is increased.

Figure 40:
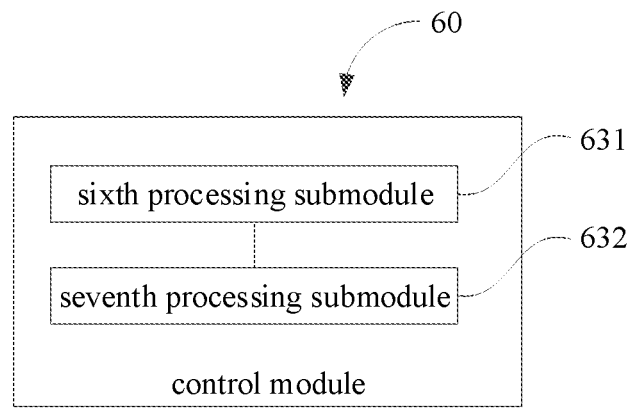
FIG. 40 is a block diagram illustrating a control module according to some embodiments of the present disclosure.

Referring to FIG. 40, in some embodiments, the control module 60 may include a sixth processing submodule 631 and a seventh processing submodule 632. The sixth processing submodule 631 is configured to process the cached main image to identify a primary color of the foreground portion. The seventh processing submodule 632 is configured to increase a saturation of the primary color.

That is, the act in block S631 may be implemented by the sixth processing submodule 631. The act in block S632 may be implemented by the seventh processing submodule 632.

Therefore, the color saturation of the foreground portion may be quickly and effectively increased, so that the foreground portion, that is, the main body is highlighted.

In detail, the primary color refers to the color in which the color channel accounts for the largest proportion in the RGB image. For example, if the red channel accounts for the largest proportion in the red, green, and blue channels of a pixel, red is the primary color. The color saturation of the red channel may be enhanced to enhance the visual effect of the foreground portion. The way to increase the saturation of the primary color may increase the proportion of the primary color.

Figure 41:
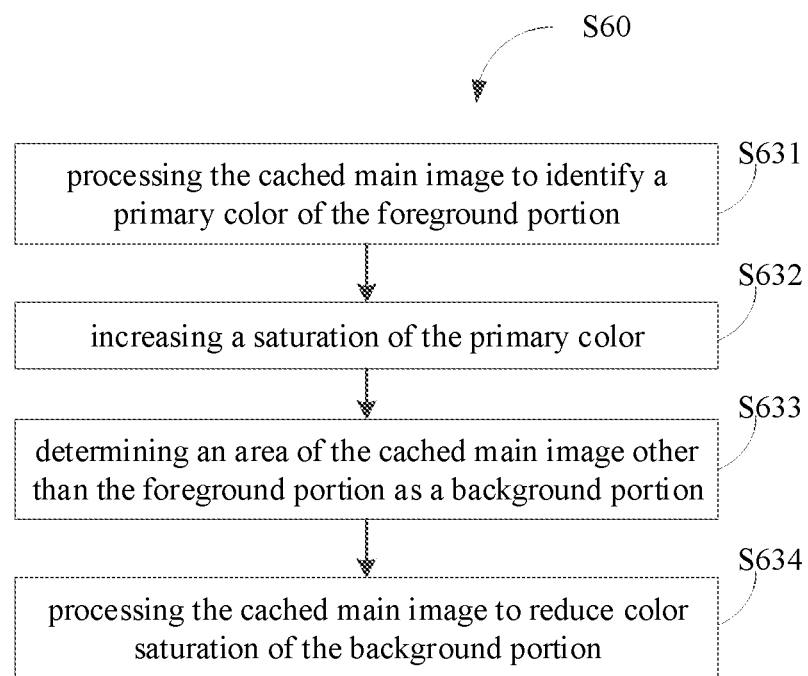
FIG. 41 is a flow chart illustrating a control method according to some embodiments of the present disclosure.

Referring to FIG. 41, in some embodiments, the act in block S60 may include act in the following blocks.

At block S633, an area of the cached main image other than the foreground portion is determined as a background portion.

At block S634, the cached main image is processed to reduce color saturation of the background portion.

Figure 42:
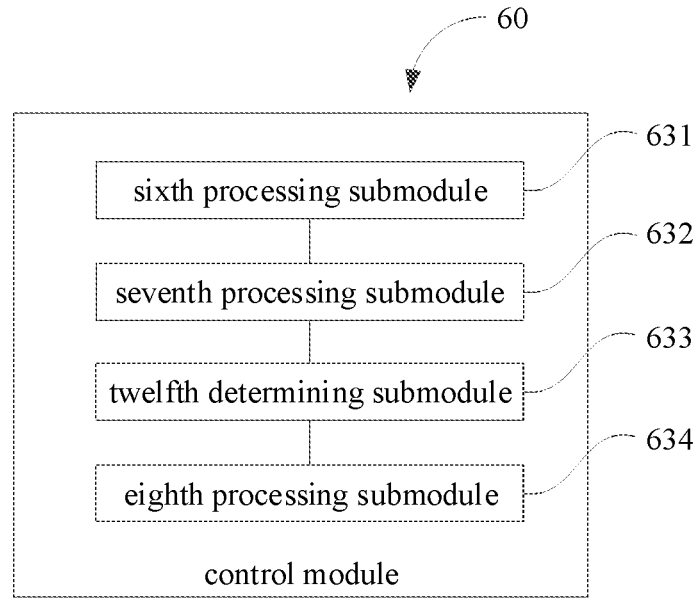
FIG. 42 is a block diagram illustrating a control module according to some embodiments of the present disclosure.

Referring to FIG. 42, in some embodiments, the control module 60 may include a twelfth determining submodule 633 and an eighth processing submodule 634. The twelfth determining submodule 633 is configured to determine an area of the cached main image other than the foreground portion as a background portion. The eighth processing submodule 634 is configured to process the cached main image to reduce color saturation of the background portion.

That is, the act in block S633 may be implemented by the twelfth determining submodule 633. The act in block S634 may be implemented by the eighth processing submodule 634.

Therefore, the color saturation of the background portion may be reduced. The foreground portion, that is, the main body may be highlighted by contrast.

Figure 43:
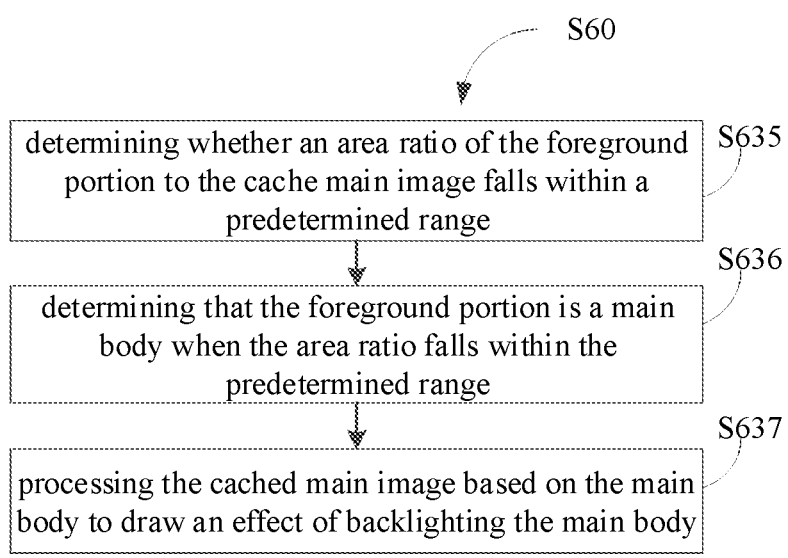
FIG. 43 is a flow chart illustrating a control method according to some embodiments of the present disclosure.

Referring to FIG. 43, in some embodiments, the act in block S60 may include acts in the following blocks.

At block S635, it is determined whether an area ratio of the foreground portion to the cache main image falls within a predetermined range.

At block S636, it is determined that the foreground portion is a main body when the area ratio falls within the predetermined range.

At block S637, the cached main image is processed based on the main body to draw an effect of backlighting the main body.

Figure 44:
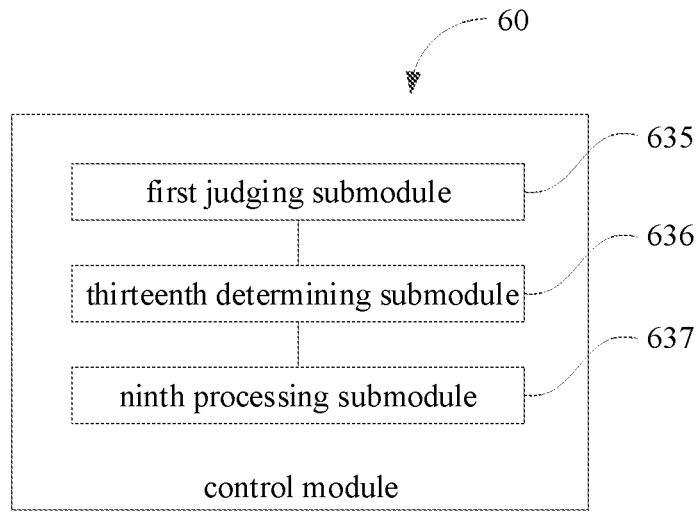
FIG. 44 is a block diagram illustrating a control module according to some embodiments of the present disclosure.

Referring to FIG. 44, in some embodiments, the control module 60 may include a first judging submodule 635, a thirteenth determining submodule 636, and a ninth processing submodule 637. The first judging submodule 635 is configured to determine whether an area ratio of the foreground portion to the cache main image falls within a predetermined range. The thirteenth determining submodule 636 is configured to determine that the foreground portion is a main body when the area ratio falls within the predetermined range. The ninth processing submodule 637 is configured to process the cached main image based on the main body to draw an effect of backlighting the main body.

That is, the act in block S635 may be implemented by the first judging submodule 635. The act in block S636 may be implemented by the thirteenth determining submodule 636. The act in block S637 may be implemented by the ninth processing submodule 637.

Therefore, the cached main image may be processed based on the foreground portion, thereby acquiring the image with a better backlighting effect.

In some embodiments, the predetermined range is 15-60.

It is to be understood that when the foreground portion accounts for 15-60 in the cache main image, the foreground portion is relatively moderate in size, so that the image with a high-quality backlighting effect may be acquired.

Figure 45:
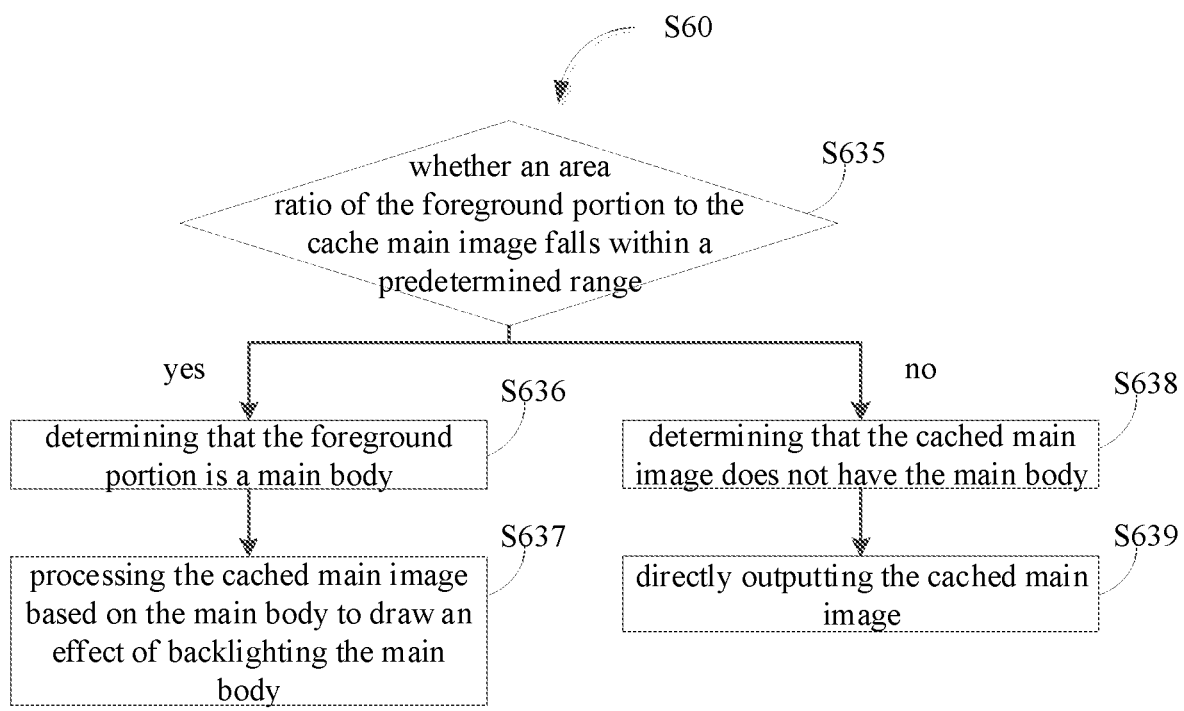
FIG. 45 is a flow chart illustrating a control method according to some embodiments of the present disclosure.

Referring to FIG. 45, in some embodiments, the act in block S60 may include an act in the following block.

At block S638, it is determined that the cached main image does not have the main body when the area ratio exceeds the predetermined range.

At block S639, the cached main image is output directly when the cached main image does not have the main body.

Figure 46:
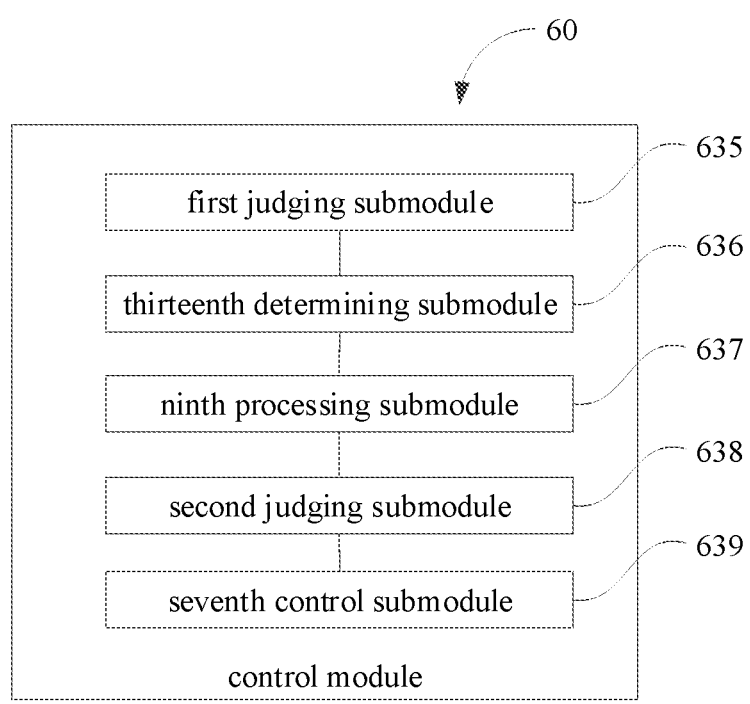
FIG. 46 is a block diagram illustrating a control module according to some embodiments of the present disclosure.

Referring to FIG. 46, in some embodiments, the control module 60 may include a second judging submodule 638 and a seventh control submodule 639. The second judging submodule 638 is configured to determine that the cached main image does not have the main body when the area ratio exceeds the predetermined range. The seventh control submodule 639 is configured to directly output the cached main image when the cached main image does not have the main body.

That is, the act in block S638 may be implemented by the second judging submodule 638. The act in block S639 may be implemented by the seventh control submodule 639.

Therefore, when the size of the foreground portion is not appropriate, it may be determined that the cached main image does not have the main body and it may directly output the cached main image, thereby reducing image processing time.

Figure 47:
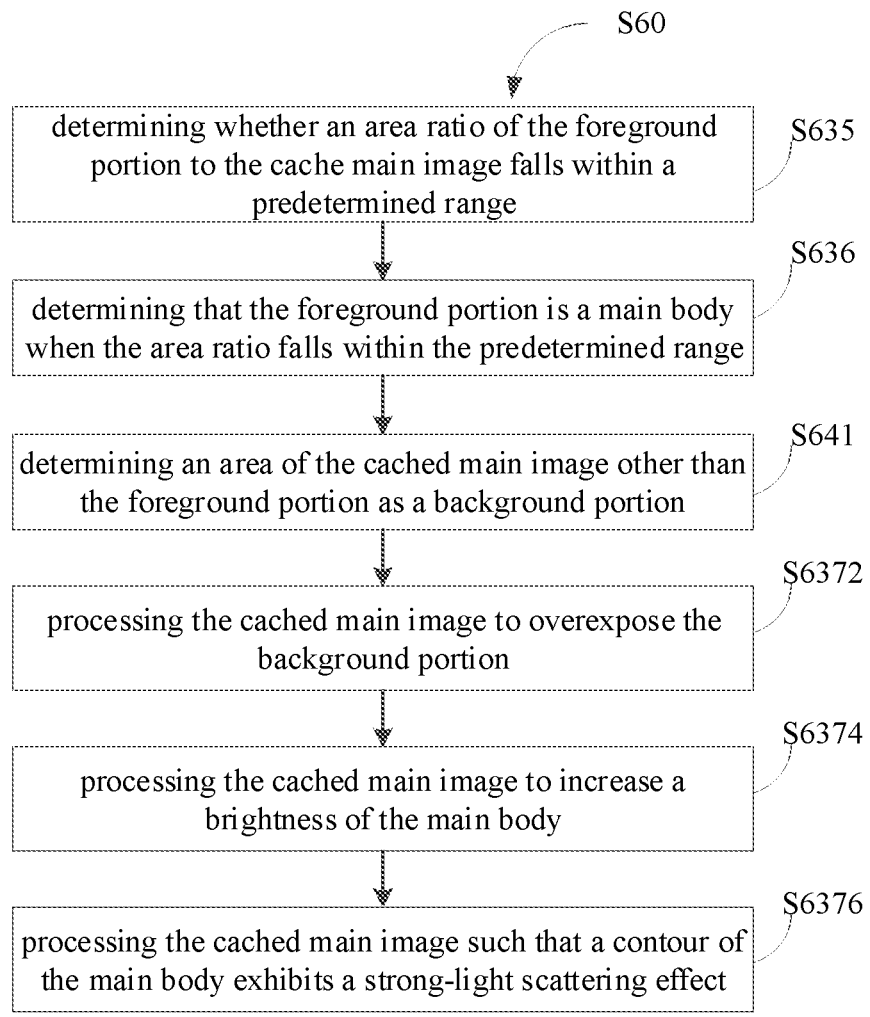
FIG. 47 is a flow chart illustrating a control method according to some embodiments of the present disclosure.

Referring to FIG. 47, in some embodiments, the act in block S60 may include an act in the following block.

At block S641, an area of the cached main image other than the foreground portion is determined as a background portion.

The act in block S637 may include acts in the following blocks.

At block S372, the cached main image is processed to overexpose the background portion.

At block S374, the cached main image is processed to increase a brightness of the main body.

At block S376, the cached main image is processed such that a contour of the main body exhibits a strong-light scattering effect.

Figure 48:
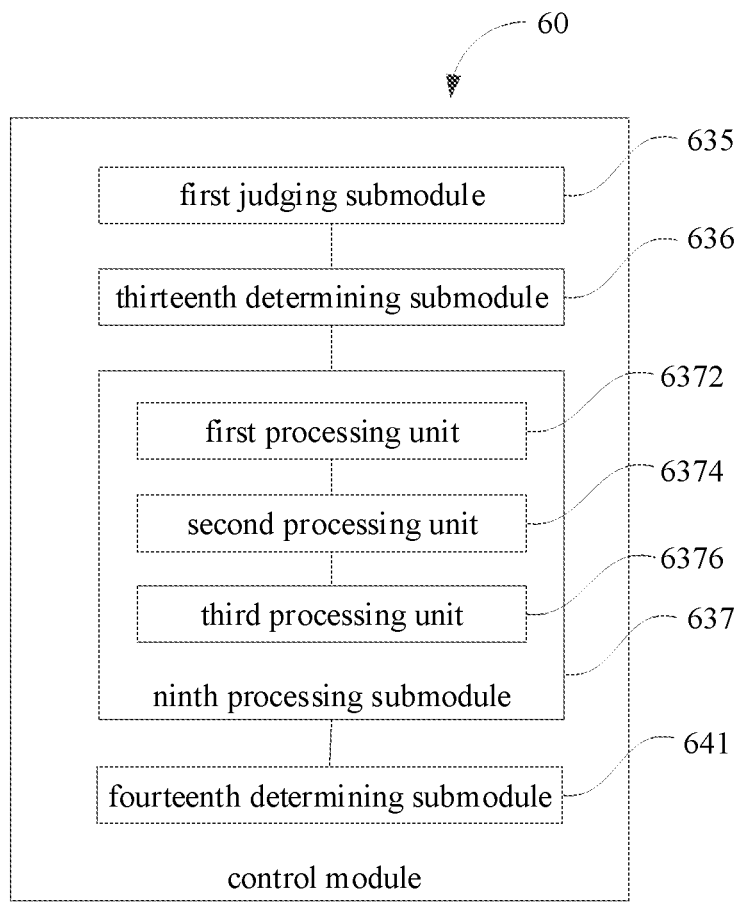
FIG. 48 is a block diagram illustrating a control module according to some embodiments of the present disclosure.

Referring to FIG. 48, in some embodiments, the control module 60 may include a fourteenth determining submodule 641. The fourteenth determining submodule 641 is configured to determine an area of the cached main image other than the foreground portion as a background portion. The ninth processing submodule 637 may include a first processing unit 6372, a second processing unit 6374, and a third processing unit 6376. The first processing unit 6372 is configured to process the cached main image to overexpose the background portion. The second processing unit 6374 is configured to process the cached main image to increase a brightness of the main body. The third processing unit 6376 is configured to process the cached main image such that a contour of the main body exhibits a strong-light scattering effect.

That is, the act in block S641 may be implemented by the fourteenth determining submodule 641. The act in block S6372 may be implemented by the first processing unit 6372. The act in block S6374 may be implemented by the second processing unit 6374. The act in block S6376 may be implemented by the third processing unit 6376.

Therefore, different image processing is performed on the background portion, the main body, and the outline of the main body, thereby acquiring the image with the scattering effect and a better visual effect.

Figure 49:
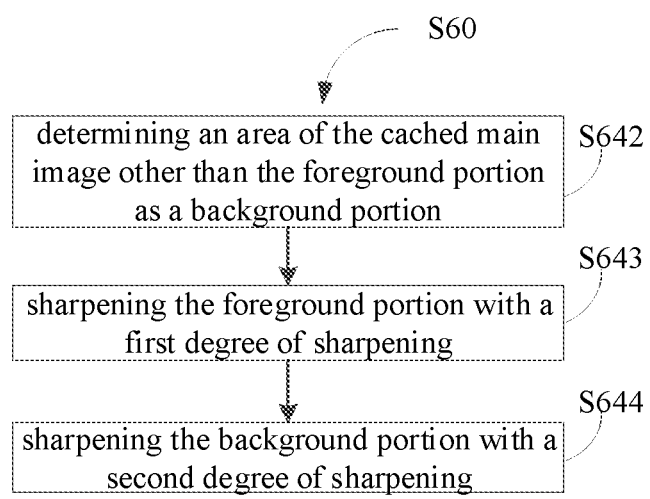
FIG. 49 is a flow chart illustrating a control method according to some embodiments of the present disclosure.
Figure 50:
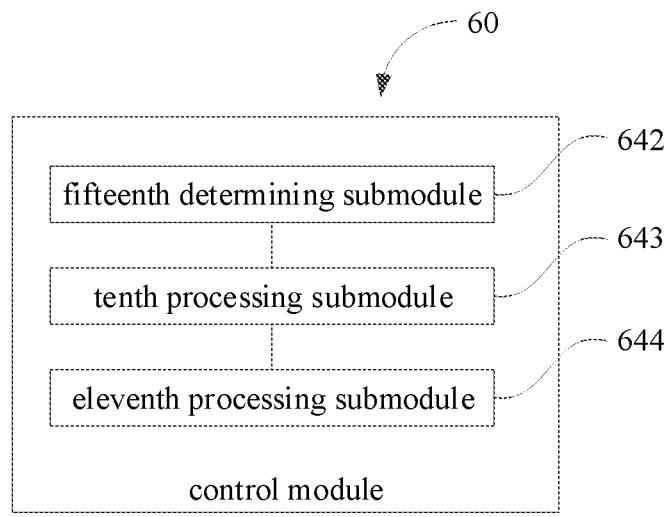
FIG. 50 is a block diagram illustrating a control module according to some embodiments of the present disclosure.

Referring to FIG. 49, in some embodiments, the act in block S60 may include acts in the following blocks.

At block S642, an area of the cached main image other than the foreground portion is determined as a background portion.

At block S643, the foreground portion is sharpened with a first degree of sharpening.

At block S644, the background portion is sharpened with a second degree of sharpening. The first degree of sharpening is greater than the second degree of sharpening.

Referring to FIG. 48, in some embodiments, the control module 60 may include a fifteenth determining submodule 642, a tenth processing submodule 643, and an eleventh processing submodule 644. The fifteenth determining submodule 642 is configured to determine an area of the cached main image other than the foreground portion as a background portion. The tenth processing submodule 643 is configured to sharpen the foreground portion with a first degree of sharpening. The eleventh processing submodule 644 is configured to sharpen the background portion with a second degree of sharpening. The first degree of sharpening is greater than the second degree of sharpening.

That is, the act in block S642 may be implemented by the fifteenth determining submodule 642. The act in block S643 may be implemented by the tenth processing submodule 643. The act in block S644 may be implemented by the eleventh processing submodule 644.

Therefore, the foreground portion and the background portion of the cached main image may be sharpened to different degrees, thereby highlighting the foreground portion as the main body.

Figure 51:
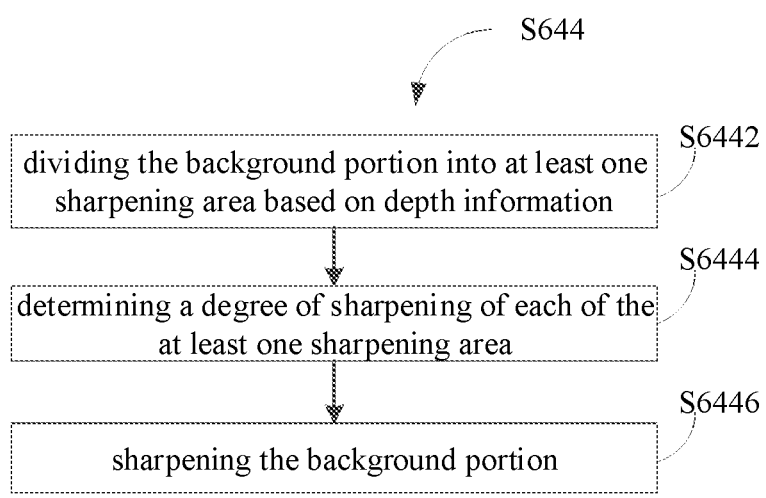
FIG. 51 is a flow chart illustrating a control method according to some embodiments of the present disclosure.

Referring to FIG. 51, in some embodiments, the act in block S644 may include an act in the following block.

At block S6442, the background portion is divided into at least one sharpening area based on depth information.

At block S6444, a degree of sharpening of each of the at least one sharpening area is determined. Each of the at least one sharpening area has the degree of sharpening less than or equal to the second degree of sharpening and being negatively correlated with a corresponding depth.

At block S6446, the background portion is sharpened.

Figure 52:
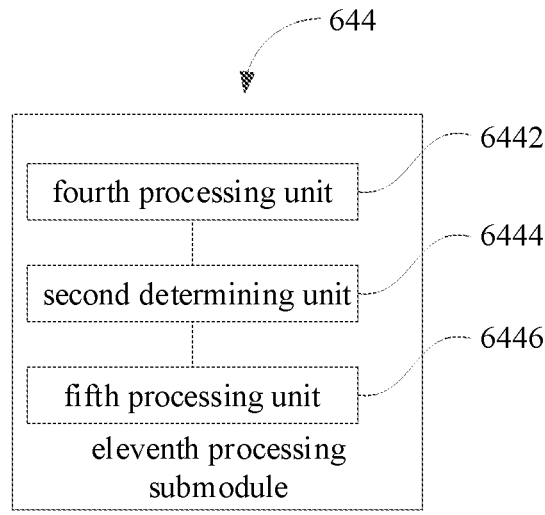
FIG. 52 is a block diagram illustrating an eleventh determining submodule according to some embodiments of the present disclosure.

Referring to FIG. 52, in some embodiments, the eleventh processing submodule 644 may include a fourth processing unit 6442, a second determining unit 6444, and a fifth processing unit 6446. The fourth processing unit 6442 is configured to divide the background portion into at least one sharpening area based on depth information. The second determining unit 6444 is configured to determine a degree of sharpening of each of the at least one sharpening area. Each of the at least one sharpening area has the degree of sharpening less than or equal to the second degree of sharpening and being negatively correlated with a corresponding depth. The fifth processing unit 6446 is configured to sharpen the background portion.

That is, the act in block S6442 may be implemented by the fourth processing unit 6442. The act in block S6444 may be implemented by the second determining unit 6444. The act in block S6446 may be implemented by the fifth processing unit 6446.

Therefore, the background portion maybe clearly layered and have a better visual effect.

In detail, the background portion may be regarded as another cached main image, and may be processed based on the image sharpening method described above. For example, the background portion is divided into a first sharpening area and a second sharpening area. The depth of the first sharpening area is smaller than that of the second sharpening area. The first sharpening area is sharpened by using the second degree of sharpening, and the third sharpening area is sharpened by using the third degree of sharpening. The second degree of sharpening is greater than the third degree of sharpening.

Figure 53:
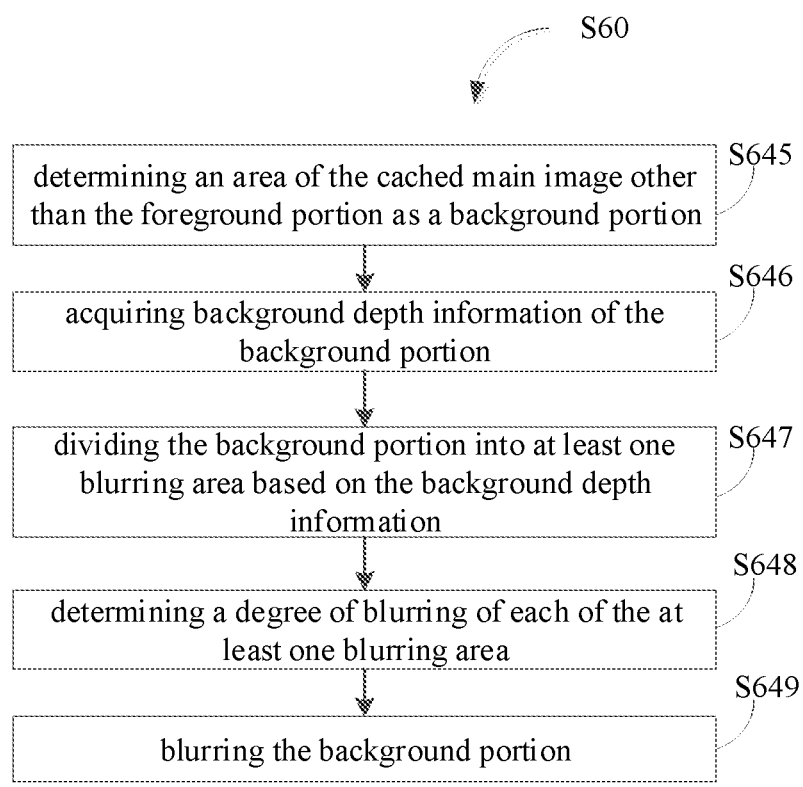
FIG. 53 is a flow chart illustrating a control method according to some embodiments of the present disclosure.

Referring to FIG. 53, in some embodiments, the act in block S644 may include acts in the following blocks.

At block S645, an area of the cached main image other than the foreground portion is determined as a background portion.

At block S646, background depth information of the background portion is acquired.

At block S647, the background portion is divided into at least one blurring area based on the background depth information. A span of a depth range corresponding to each of the at least one blurring area is positively correlated with a distance of the depth range to a foremost point of the cache main image.

At block S648, a degree of blurring of each of the at least one blurring area is determined. The degree of blurring of each of the at least one blurring area is positively correlated with a corresponding depth.

At block S649, the background portion is blurred.

Figure 54:
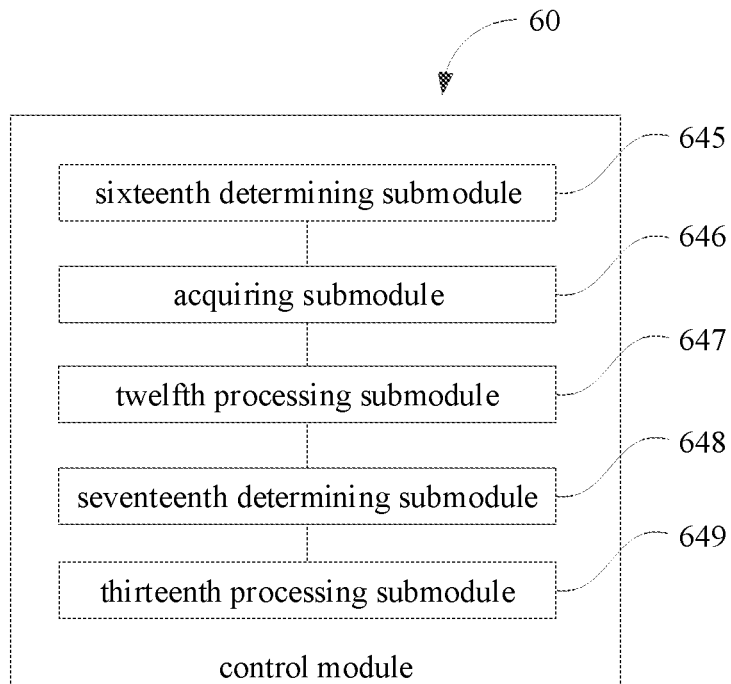
FIG. 54 is a block diagram illustrating a control module according to some embodiments of the present disclosure.

Referring to FIG. 54, in some embodiments, the control module 60 may include a sixteenth determining submodule 645, an acquiring submodule 646, a twelfth processing submodule 647, a seventeenth determining submodule 648, and a thirteenth processing submodule 649. The sixteenth determining submodule 645 is configured to determine an area of the cached main image other than the foreground portion as a background portion. The acquiring submodule 646 is configured to acquire background depth information of the background portion. The twelfth processing submodule 647 is configured to divide the background portion into at least one blurring area based on the background depth information. A span of a depth range corresponding to each of the at least one blurring area is positively correlated with a distance of the depth range to a foremost point of the cache main image. The seventeenth determining submodule 648 is configured to determine a degree of blurring of each of the at least one blurring area. The degree of blurring of each of the at least one blurring area is positively correlated with a corresponding depth. The thirteenth processing submodule 649 is configured to blur the background portion.

That is, the act in block S645 may be implemented by the sixteenth determining submodule 645. The act in block S646 may be implemented by the acquiring submodule 646. The act in block S647 may be implemented by the twelfth processing submodule 647. The act in block S648 may be implemented by the seventeenth determining submodule 648. The act in block S649 may be implemented by the thirteenth processing submodule 649.

Therefore, the background portion of the cached main image may be divided into a plurality of blurring areas, and the different blurring areas are blurred to different degrees, so that the blurring effect of the image is more natural, closer to the optical virtual focus effect, and the user's visual sense is improved.

Figure 55:
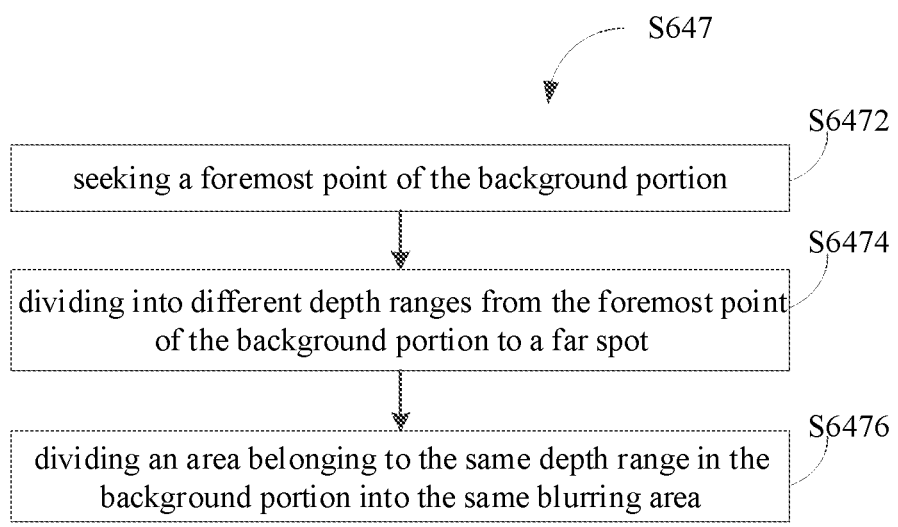
FIG. 55 is a flow chart illustrating a control method according to some embodiments of the present disclosure.

Referring to FIG. 55, in some embodiments, the act in block S647 may include acts in the following blocks.

At block S6472, a foremost point of the background portion is sought.

At block S6474, it is divided into different depth ranges from the foremost point of the background portion to a far spot.

At block S6476, an area belonging to the same depth range in the background portion is divided in the same blurring area.

Figure 56:
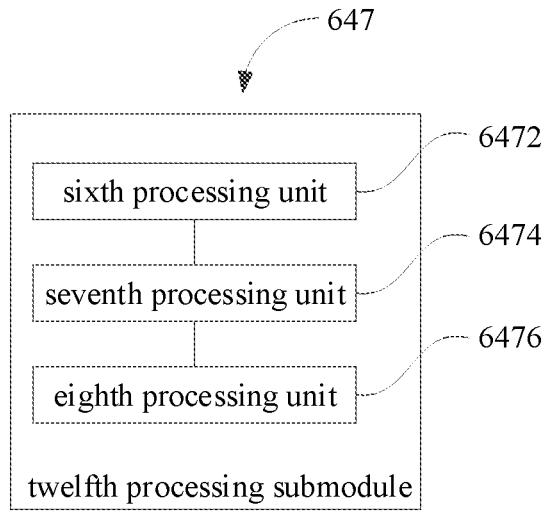
FIG. 56 is a block diagram illustrating a twelfth determining submodule according to some embodiments of the present disclosure.

Referring to FIG. 56, in some embodiments, the twelfth processing submodule 647 may include a sixth processing unit 6472, a seventh processing unit 6474, and an eighth processing unit 6476. The sixth processing unit 6472 is configured to seek a foremost point of the background portion. The seventh processing unit 6474 is configured to divide into different depth ranges from the foremost point of the background portion to a far spot. The eighth processing unit 6476 is configured to divide an area belonging to the same depth range in the background portion into the same blurring area.

That is, the act in block S6472 may be implemented by the sixth processing unit 6472. The act in block S6474 may be implemented by the seventh processing unit 6474. The act in block S6476 may be implemented by the eighth processing unit 6476.

Therefore, the background portion is divided into a plurality of blurring areas based on the depth of the background portion, and each of the blurred areas corresponds to a preset depth range, to perform different degrees of blurring operations on the respective blurring areas.

It should be noted that the span of the depth range corresponding to each blurring area is related to the depth position where each blurring area is located. The deeper the depth of the blurring area, the larger the span of the depth range corresponding to the blurring area. The first depth range closest to the foremost point of the cached main image is the first blurring area. The blurring area immediately after the first blurring area is the second blurring area. The second blurring area has the second depth range. The blurring area immediately after the second blurring area is the third blurring area. The third blurring area has the third depth range, and so on. The span of the first depth range is smaller than the span of the second depth range. The span of the second depth range is smaller than the span of the third depth range, and so on. Therefore, the greater the span of the preset depth range of the blurring area farther from the foremost point of the background portion, the closer the blurring effect of the blurred image to the effect of the optical virtual focus, and the user's visual experience is better.

Figure 57:
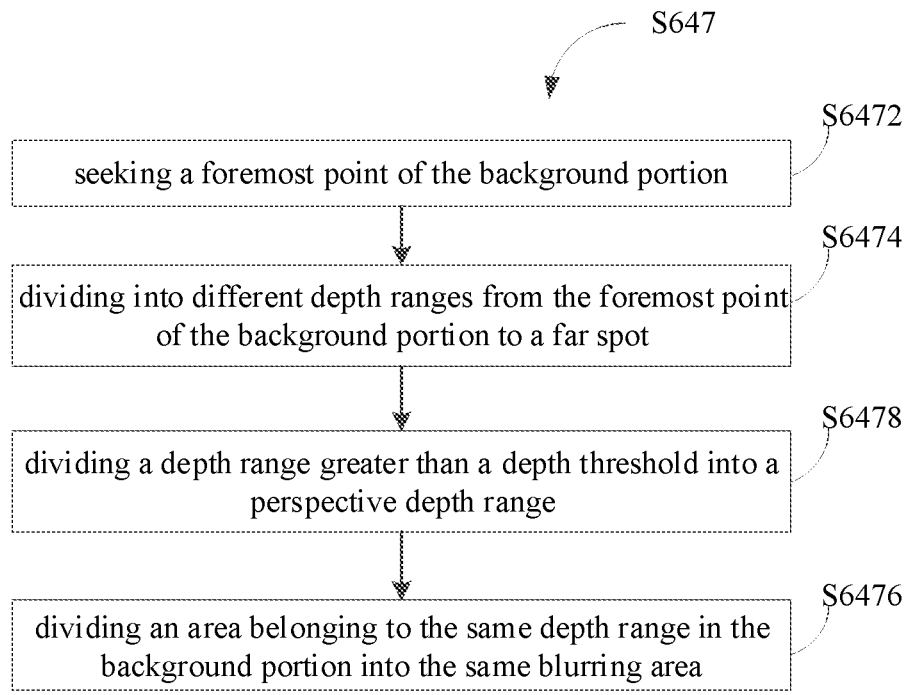
FIG. 57 is a flow chart illustrating a control method according to some embodiments of the present disclosure.

Referring to FIG. 57, in some embodiments, the act in block S6474 may include an act in the following block.

At block S6478, a depth range greater than a depth threshold is divided into a perspective depth range.

Referring to FIG. 56 again, in some embodiments, the seventh processing unit 6474 is further configured to divide a depth range greater than a depth threshold into a perspective depth range.

That is, the act in block S6478 may be implemented by the seventh processing unit 6474.

It is to be understood that when the depth of the background portion is greater than a certain depth threshold, the accuracy of the obtained depth information of each object of the background portion having the depth greater than the depth threshold, is smaller. The background portion having the depth greater than the depth threshold is divided into the plurality of blurring areas, and the difference in the degree of blurring of each of the blurring areas is not obvious, so that dividing the background portion having the depth greater than the depth threshold into a plurality of blurring areas has little effect. Therefore, the background portion having the depth greater than the depth threshold is directly divided into the perspective depth range. The perspective depth range is a blurring area.

Figure 58:
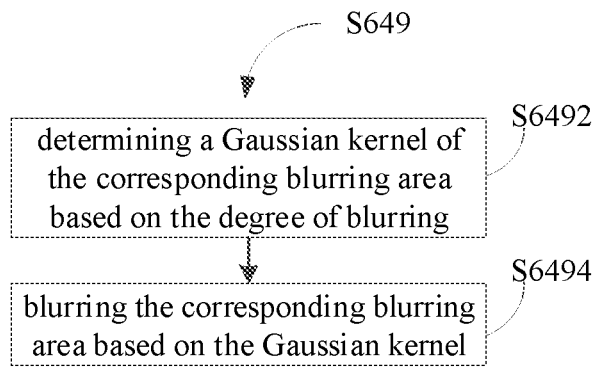
FIG. 58 is a flow chart illustrating a control method according to some embodiments of the present disclosure.

Referring to FIG. 58, in some embodiments, the act in block S649 may include acts in the following blocks.

At block S6492, a Gaussian kernel of the corresponding blurring area is determined based on the degree of blurring.

At block S6494, the corresponding blurring area is blurred based on the Gaussian kernel.

Figure 59:
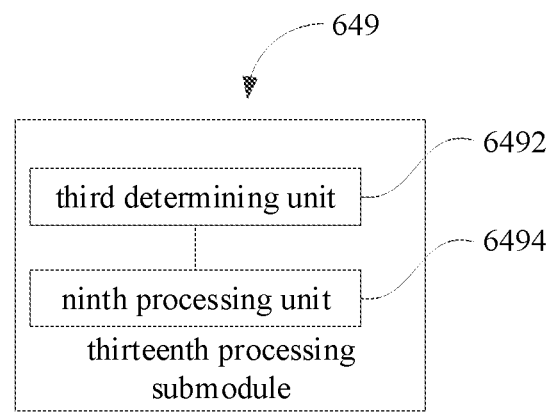
FIG. 59 is a block diagram illustrating a thirteenth determining submodule according to some embodiments of the present disclosure.

Referring to FIG. 59, in some embodiments, the thirteenth processing submodule 649 may include a third determining unit 6492 and a ninth processing unit 6494. The third determining unit 6492 is configured to determine a Gaussian kernel of the corresponding blurring area based on the degree of blurring. The ninth processing unit 6494 is configured to blur the corresponding blurring area based on the Gaussian kernel.

That is, the act in block S6492 may be implemented by the third determining unit 6492. The act in block S6494 may be implemented by the ninth processing unit 6494

Therefore, different Gaussian kernels are employed to perform different degrees of blurring on the respective blurred areas of the background portion of the cached main image, thereby improving the blurring effect of the image.

In detail, the image blurring is generally performed by a Gaussian kernel function for fuzzy processing. The Gaussian kernel may be regarded as a weight matrix. A Gaussian fuzzy value calculation is performed for each pixel using a different weight matrix, so that different blurring effects may be acquired. The weight matrix is related to the variance of the Gaussian kernel function. The larger the variance, the wider the radial action range of the Gaussian kernel function, and the better the smoothing effect, i.e., the higher the degree of fuzzy. When calculating the Gaussian fuzzy value of each pixel, the pixel to be calculated is taken as the center pixel, and the weight matrix is employed to weight the pixel values of the pixel points around the center pixel to finally acquire the Gaussian fuzzy value of the pixel to be calculated. In an embodiment of the present disclosure, the same blurring area employs the same weight matrix such that the same blurring area has the same blurring effect. Different blurring areas employ different weight matrixes. The smaller the variance corresponding to the weight matrix of the blurring area farther from the front part of the background portion, the higher the degree of blurring.

Figure 60:
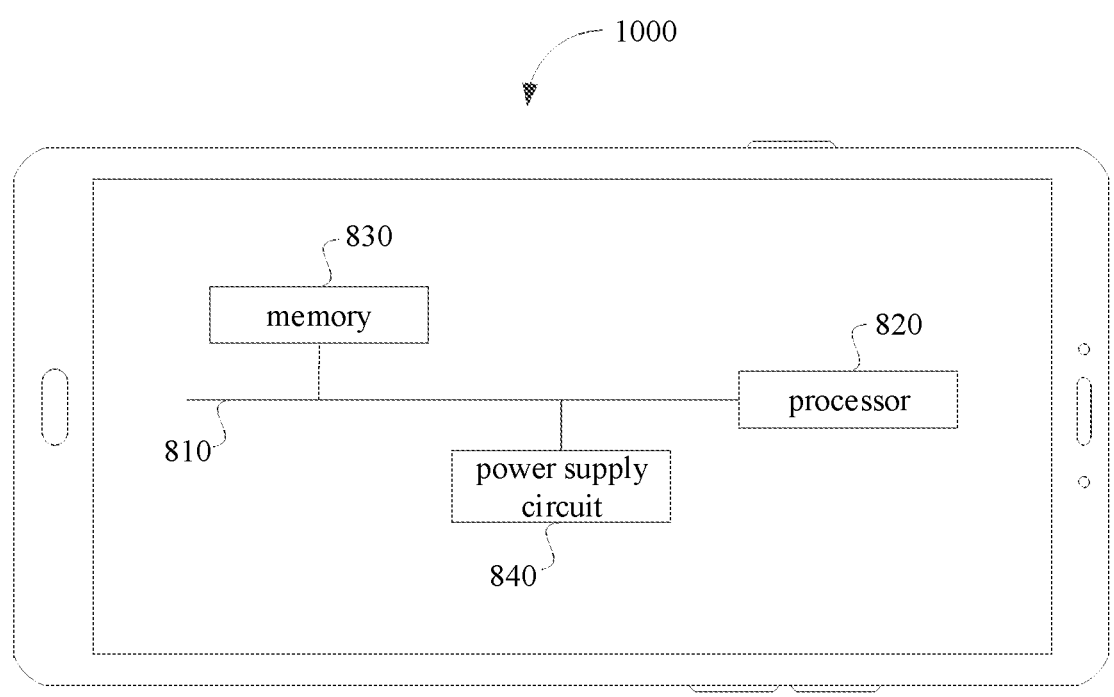
FIG. 60 is a block diagram illustrating an electronic device according to some embodiments of the present disclosure.

Referring to FIG. 60, an electronic device 1000 of the embodiment of the present disclosure may include a circuit board 810, a processor 820, a memory 830, and a power supply circuit 840. The circuit board 810 is disposed inside a space of the electronic device 1000. The processor 820 and the memory 830 are disposed on the circuit board 810. The power supply circuit 840 is configured to supply power to each circuit or apparatus of the electronic device 1000.

The memory 830 is configured to store executable program codes. The processor 820 is configured to read the executable program codes stored in the memory 830 to execute a program corresponding to the executable program codes for performing the control method of any one of the embodiments of the present disclosure. The processor 820 is configured to perform the following acts: processing the scene data to acquire depth information of the cached main image; acquiring a foreground portion of the cached main image based on the depth information; and controlling the electronic device based on the foreground portion.

The processor 820 is further configured to perform the following acts: determining a structure type of a current 3D space based on the foreground portion and the orientation; searching, in a preset database, a current composition recommendation corresponding to the structure type of the current 3D space, the preset database comprising a plurality of foreground types and corresponding composition recommendations; controlling the displayer 300 to display the current composition recommendation; determining a reference exposure based on brightness information of the foreground portion; determining an exposure for a dark frame and an exposure for a bright frame based on the reference exposure, the exposure for the dark frame being smaller than the reference exposure, the exposure for the bright frame being greater than the reference exposure; and controlling the imaging device to expose based on the reference exposure, the exposure for the dark frame, and the exposure for the bright frame.

It should be noted that the foregoing description of the control method and the control apparatus 100 is also applicable to the electronic device 1000 of the embodiment of the present disclosure, and details are not described herein again.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling an electronic device based on scene data collected by an imaging apparatus of the electronic device, the scene data comprising a cached main image, and the method comprising:

processing the scene data to acquire depth information of the cached main image;

acquiring a foreground portion of the cached main image based on the depth information; and controlling the electronic device based on the foreground portion, comprising:

determining a structure type of a current three-dimensional (3D) space based on the foreground portion and an orientation;

searching, in a preset database, a current composition recommendation corresponding to the structure type of the current 3D space, the preset database comprising a plurality of foreground types and corresponding composition recommendations; and controlling the electronic device to acquire a scene image that conforms to the current composition recommendation.

2. The method of claim 1, wherein controlling the electronic device based on the foreground portion further comprises:

controlling a displayer to display the current composition recommendation.

3. The method of claim 2, wherein the imaging apparatus comprises a rotatable camera, and controlling the electronic device to acquire the scene image that conforms to the current composition recommendation comprises: controlling the rotatable camera to rotate to acquire the scene image that conforms to the current composition recommendation, or wherein controlling the electronic device to acquire the scene image that conforms to the current composition recommendation comprises: controlling the electronic device to crop the cached main image to acquire a cropped image that conforms to the current composition recommendation, or wherein, the electronic device comprises an actuator coupled to the imaging apparatus, and controlling the electronic device to acquire the scene image that conforms to the current composition recommendation comprises: controlling the actuator to drive the imaging apparatus to change a state to acquire a scene image that conforms to the current composition recommendation, or wherein the imaging apparatus comprises a wide-angle camera and a telephoto camera; and controlling the electronic device to acquire the scene image that conforms to the current composition recommendation comprises: controlling the wide-angle camera or the telephoto camera to acquire a scene image that conforms to the current composition recommendation.

4. The method of claim 3, wherein the imaging apparatus comprises a main lens for acquiring an optical image, and an image sensor disposed under the main lens and for converting the optical image into the cached main image, and controlling the actuator to drive the imaging apparatus to change the state to acquire the scene image that conforms to the current composition recommendation comprises:

controlling the actuator to drive at least one of: the main lens, the image sensor, and the imaging apparatus, to move to acquire the scene image.

5. The method of claim 1, wherein determining the current foreground type based on the foreground portion comprises:

determining the foreground type based on at least one of: a size and a shape of the foreground portion, a size and a shape of a background portion of the cached main image, and a positional cooperation relationship between the foreground portion and the background portion.

6. The method of claim 1, wherein controlling the electronic device based on the foreground portion comprises:

determining a reference exposure based on brightness information of the foreground portion;

determining an exposure for a dark frame and an exposure for a bright frame based on the reference exposure, the exposure for the dark frame being smaller than the reference exposure, the exposure for the bright frame being greater than the reference exposure; and controlling the imaging apparatus to expose based on the reference exposure, the exposure for the dark frame, and the exposure for the bright frame.

7. The method of claim 6, wherein the reference exposure comprises a time of exposure, and a sensitivity of the imaging apparatus, and controlling the electronic device based on the foreground portion comprises:

determining the time of exposure based on motion information of the foreground portion; and determining the sensitivity based on the reference exposure and the time of exposure.

8. The method of claim 6, wherein determining the exposure for the dark frame and the exposure for the bright frame based on the reference exposure comprises:

acquiring an area where a brightness value is greater than a first brightness threshold in the cached main image, as a high-light area;

acquiring an area where the brightness value is smaller than a second brightness threshold in the cached main image, as a low-light area, and the first brightness threshold is greater than the second brightness threshold;

determining the exposure for the dark frame and the exposure for the bright frame based on a ratio of the high-light area and the low-light area, and the reference exposure;

determining an area of the cached main image other than the foreground portion as a background portion; and adjusting the exposure for the dark frame and the exposure for the bright frame based on brightness information of the background portion.

9. The method of claim 1, wherein the cached main image comprises a first exposure value, and controlling the electronic device based on the foreground portion comprises:

processing the cached main image to distinguish a brightness area and a dark area of the foreground portion;

processing the cached main image to increase a brightness of the dark area of the foreground portion with a second exposure value;

determining an area of the cached main image other than the foreground portion as a background portion; and processing the cached main image to increase a brightness of the background portion with a third exposure value that is greater than the first exposure value and less than the second exposure value.

10. The method of claim 9, wherein processing the cached main image to distinguish the brightness area and the dark area of the foreground portion comprises:
processing a histogram of the cached main image to distinguish the bright area and the dark area.

11. The method of claim 9, wherein controlling the electronic device based on the foreground portion comprises:
processing the cached main image to distinguish a bright area and a dark area of the background portion; and
wherein processing the cached main image to increase the brightness of the background portion with the third exposure value comprises:
processing the cached main image to increase a brightness of the dark area of the background portion with the third exposure value.

12. The method of claim 1, wherein controlling the electronic device based on the foreground portion comprises:
processing the cached main image to identify a primary color of the foreground portion;
increasing a saturation of the primary color;
determining an area of the cached main image other than the foreground portion as a background portion; and
processing the cached main image to reduce color saturation of the background portion.

13. The method of claim 1, wherein controlling the electronic device based on the foreground portion comprises:
determining whether an area ratio of the foreground portion to the cache main image falls within a predetermined range;
determining that the foreground portion is a main body when the area ratio falls within the predetermined range;
processing the cached main image based on the main body to draw an effect of backlighting the main body;
determining that the cached main image does not have the main body when the area ratio exceeds the predetermined range; and
directly outputting the cached main image when the cached main image does not have the main body.

14. The method of claim 13, wherein controlling the electronic device based on the foreground portion comprises:
determining an area of the cached main image other than the foreground portion as a background portion; and
wherein processing the cached main image based on the main body to draw an effect of backlighting the main body comprises:
processing the cached main image to overexpose the background portion;
processing the cached main image to increase a brightness of the main body; and
processing the cached main image such that a contour of the main body exhibits a strong-light scattering effect.

15. The method of claim 1, wherein controlling the electronic device based on the foreground portion comprises:
determining an area of the cached main image other than the foreground portion as a background portion;
sharpening the foreground portion with a first degree of sharpening; and
sharpening the background portion with a second degree of sharpening, the first degree of sharpening being greater than the second degree of sharpening.

16. The method of claim 15, wherein sharpening the background portion with the second degree of sharpening comprises:
dividing the background portion into at least one sharpening area based on depth information;
determining a degree of sharpening of each of the at least one sharpening area, each of the at least one sharpening area having the degree of sharpening less than or equal to the second degree of sharpening and being negatively correlated with a corresponding depth; and
sharpening the background portion.

17. The method of claim 1, wherein controlling the electronic device based on the foreground portion comprises:
determining an area of the cached main image other than the foreground portion as a background portion;
acquiring background depth information of the background portion;
dividing the background portion into at least one blurring area based on the background depth information, a span of a depth range corresponding to each of the at least one blurring area being positively correlated with a distance of the depth range to a foremost point of the cache main image;
determining a degree of blurring of each of the at least one blurring area, the degree of blurring of each of the at least one blurring area being positively correlated with a corresponding depth; and
blurring the background portion.

18. The method of claim 17, wherein dividing the background portion into the at least one blurring area based on the background depth information, comprises:
seeking a foremost point of the background portion;
dividing into different depth ranges from the foremost point of the background portion to a far spot;
dividing an area belonging to the same depth range in the background portion into the same blurring area; and
dividing a depth range greater than a depth threshold into a perspective depth range.

19. The method of claim 18, wherein blurring the background portion comprises: determining a Gaussian kernel of the corresponding blurring area based on the degree of blurring; and
blurring the corresponding blurring area based on the Gaussian kernel.

20. An electronic device, comprising:
an imaging apparatus;
a memory configured to store executable program codes; and
a processor configured to read the executable program codes stored in the memory to execute a program corresponding to the executable program codes for performing a method for controlling the electronic device based on scene data collected by the imaging apparatus, the method comprising:
processing the scene data to acquire depth information of a cached main image;
acquiring a foreground portion of the cached main image based on the depth information; and
controlling the electronic device based on the foreground portion, comprising:
determining a structure type of a current three-dimensional (3D) space based on the foreground portion and an orientation;
searching, in a preset database, a current composition recommendation corresponding to the structure type of the current 3D space, the preset database comprising a plurality of foreground types and corresponding composition recommendations; and controlling the electronic device to acquire a scene image that conforms to the current composition recommendation.

\* \* \* \* \*